(12) United States Patent
Senno et al.

(10) Patent No.: US 8,102,746 B2
(45) Date of Patent: Jan. 24, 2012

(54) METHOD OF RECORDING DATA, METHOD OF MANUFACTURING READ-ONLY OPTICAL DISC, AND READ-ONLY OPTICAL DISC

(75) Inventors: Toshihiko Senno, Kanagawa (JP); Akiya Saito, Kanagawa (JP)

(73) Assignee: Sony Disc & Digital Solutions, Inc., Tokyo (JP)

( * ) Notice: Subject to any disclaimer, the term of this patent is extended or adjusted under 35 U.S.C. 154(b) by 809 days.

(21) Appl. No.: 12/124,746

(22) Filed: May 21, 2008

(65) Prior Publication Data

US 2008/0310265 A1   Dec. 18, 2008

(30) Foreign Application Priority Data

Jun. 12, 2007   (JP) ............................... P2007-155278

(51) Int. Cl.
*G11B 20/12*   (2006.01)
(52) U.S. Cl. .................................................. 369/59.25
(58) Field of Classification Search ............... 369/47.21, 369/59.25, 275.3, 53.21
See application file for complete search history.

(56) References Cited

U.S. PATENT DOCUMENTS

| 6,788,635 | B1 | 9/2004 | Aratani et al. |
| 7,072,260 | B1 | 7/2006 | Sako et al. |
| 7,236,439 | B2 | 6/2007 | Usui et al. |
| 2003/0152009 | A1* | 8/2003 | Usui et al. ................. 369/59.25 |
| 2009/0067309 | A1* | 3/2009 | Kobayashi et al. ......... 369/59.26 |

FOREIGN PATENT DOCUMENTS

| JP | 2001-008145 | 2/2001 |
| JP | 2001-135021 | 5/2001 |
| WO | 02-101733 | 12/2002 |
| WO | WO 2006049029 A1 * | 5/2006 |

* cited by examiner

*Primary Examiner* — Joseph Haley
*Assistant Examiner* — Nicholas Lee
(74) *Attorney, Agent, or Firm* — K&L Gates LLP

(57) ABSTRACT

A method of recording data includes: a first recording step of recording data in a condition that, within a certain error correction block in a data format in which error correction blocks with n rows and m columns including at least main data, error detection code, and error correction parity are formed, an allocated location of additional supplementary information is set in a location in the same column as an allocated location of the error detection code, and an additional recording area is formed for recording additional information containing the additional supplementary information and the error detection code and the error correction parity necessary to be recorded according to the recording of the additional supplementary information; and a second recording step of recording the additional information in the additional recording area after the data recording at the first step is executed.

7 Claims, 19 Drawing Sheets

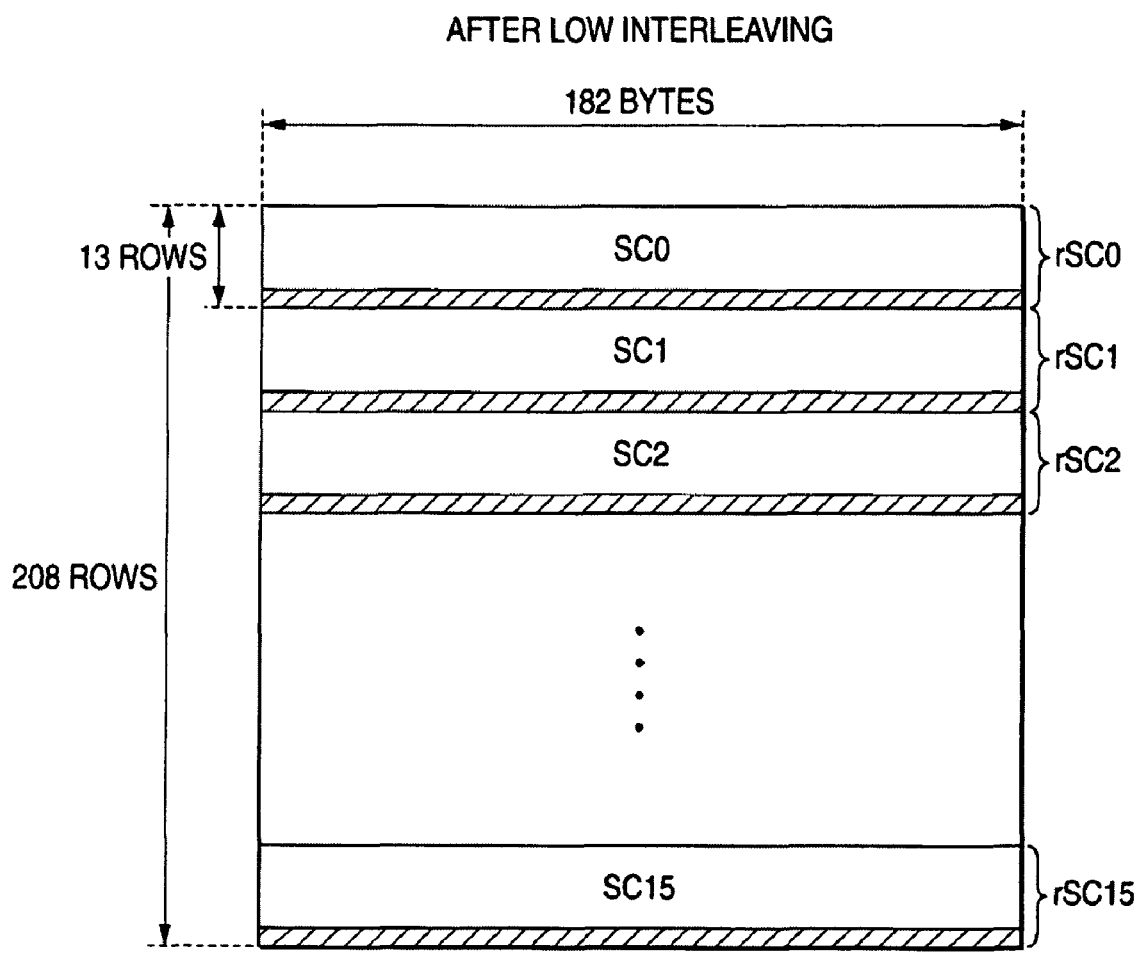

ECC BLOCK

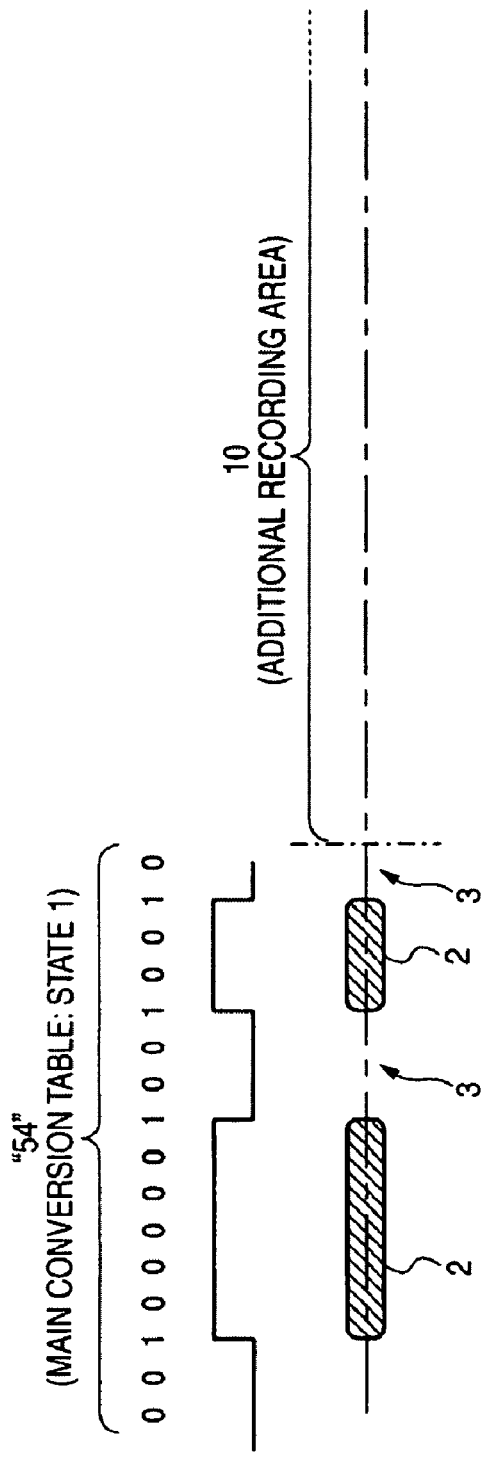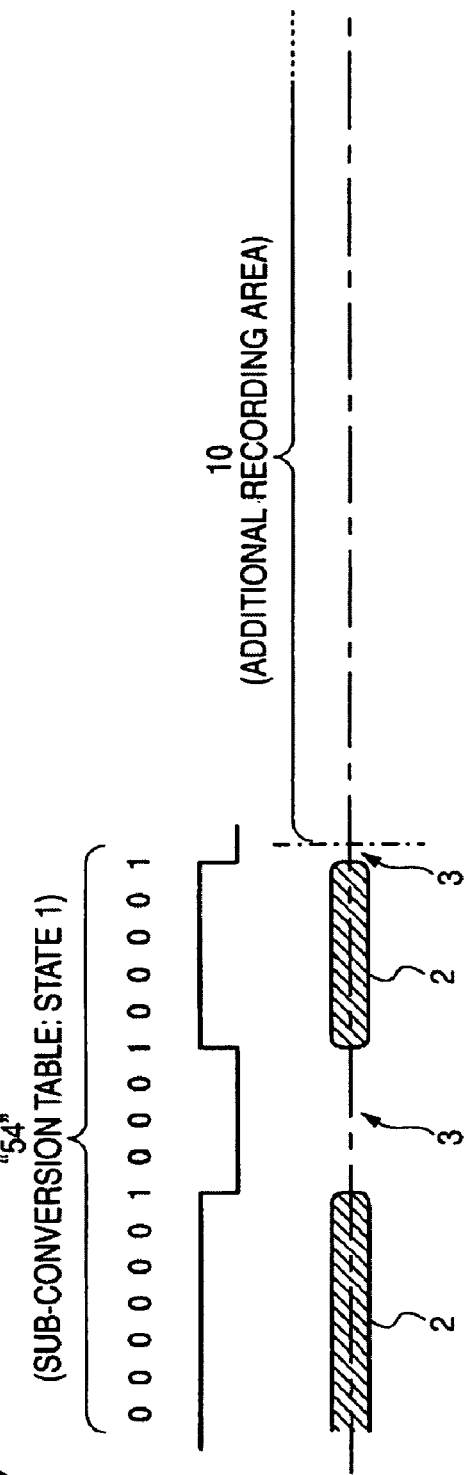

FIG. 14

EFM + MAIN CONVERSION TABLE

| DATA SYMBOL | STATE 1 | | STATE 2 | | STATE 3 | | STATE 4 | |
|---|---|---|---|---|---|---|---|---|
| | CODE WARD MSB　　LSB | NEXT STATE | CODE WARD MSB　　LSB | NEXT STATE | CODE WARD MSB　　LSB | NEXT STATE | CODE WARD MSB　　LSB | NEXT STATE |
| 0 | 00100000000001001 | 1 | 01000001001000000 | 2 | 00100000000001001 | 1 | 01000000100100000 | 2 |
| 1 | 00100000000010010 | 1 | 00100000000010010 | 1 | 10000001000100000 | 3 | 10000001000100010 | 3 |
| 2 | 00100000100100000 | 2 | 00100000100100000 | 2 | 10000000000010010 | 1 | 10000000000100010 | 1 |
| 3 | 00100000001001000 | 2 | 00100010010000000 | 2 | 10000000001001000 | 2 | 01000101001000000 | 4 |
| 4 | 00100000010010000 | 2 | 00100000010010000 | 2 | 10000000100100000 | 2 | 10000001001000000 | 2 |
| 5 | 00100000000100100 | 2 | 00100000000100100 | 2 | 10010010000000000 | 4 | 10010010000100000 | 4 |
| 6 | 00100000000100100 | 3 | 00100000000100100 | 3 | 10001000000000000 | 4 | 10001001000000000 | 4 |
| 7 | 00100000001001000 | 3 | 00100000000010010 | 3 | 00100000001001000 | 3 | 01000000000010010 | 1 |
| ... | ... | ... | ... | ... | ... | ... | ... | ... |
| 46 | 00100010100000010 | 1 | 00100010010000010 | 1 | 10000001000100001 | 1 | 10000001001000001 | 1 |
| 47 | 00100010001001001 | 1 | 01000010010000001 | 1 | 00100000010000001 | 1 | 01000010010000001 | 1 |
| 48 | 00100010010000001 | 1 | 00010010001000001 | 1 | 10000000100010000 | 2 | 10000000100010000 | 2 |
| 49 | 00100010010100010 | 1 | 00010010010000010 | 1 | 10000001000010000 | 2 | 10000001000010000 | 2 |
| 50 | 00100001001000001 | 1 | 00100010010000001 | 1 | 10000000100010000 | 3 | 10000000100010000 | 3 |
| 51 | 00100001000010001 | 1 | 01000010100010001 | 1 | 00010000100010001 | 1 | 01000010010010001 | 1 |
| 52 | 00100001001001010 | 1 | 00010000100100010 | 1 | 10000001001000010 | 1 | 10000001001000010 | 1 |
| 53 | 00100000100100001 | 1 | 00100000100010001 | 1 | 10000000100010001 | 1 | 10000000100010001 | 1 |
| 54 | 00100000010010010 | 1 | 00100000100010010 | 1 | 10000000100010010 | 1 | 10000000100010010 | 1 |
| ... | ... | ... | ... | ... | ... | ... | ... | ... |
| 86 | 00010000100000100 | 3 | 00010000010000100 | 3 | 10010001000100100 | 2 | 10010001000101100 | 2 |
| 87 | 00010000010001000 | 3 | 01000010001000000 | 3 | 00001000010001000 | 3 | 01000010001000000 | 3 |
| 88 | 00010001001000000 | 3 | 00010001000010000 | 3 | 10010010001001000 | 2 | 10010010001001000 | 2 |
| 89 | 00010001000100000 | 3 | 00010001000100000 | 3 | 10010000010000001 | 3 | 10010001001000000 | 3 |
| ... | ... | ... | ... | ... | ... | ... | ... | ... |
| 254 | 00000001010000100 | 2 | 00010001000010001 | 2 | 10010000000010000 | 2 | 01000010000010001 | 2 |
| 255 | 00000001000001000 | 2 | 01000010000010010 | 2 | 10010010100010000 | 2 | 01000010000010010 | 1 |

WITH SUB-CONVERSION TABLE

FIG. 15

EFM+ SUB-CONVERSION TABLE

| DATA SIMBOL | STATE 1 CODE WARD MSB           LSB | NEXT STATE | STATE 2 CODE WARD MSB           LSB | NEXT STATE | STATE 3 CODE WARD MSB           LSB | NEXT STATE | STATE 4 CODE WARD MSB           LSB | NEXT STATE |
|---|---|---|---|---|---|---|---|---|
| 0 | 00000010010000000 | 4 | 0000010010000000 | 4 | 01001000010001000 | 2 | 01001000010001000 | 2 |
| 1 | 00000100100000000 | 4 | 00000100100000000 | 4 | 01001000001001000 | 3 | 01001000001001000 | 3 |
| 2 | 00010010000000000 | 4 | 00100010000000000 | 4 | 01001000000001001 | 1 | 01001000000001001 | 1 |
| 3 | 00000010001000000 | 4 | 01001000000000001 | 1 | 10000010000000000 | 4 | 01001000000000001 | 1 |
| 4 | 00000000100100000 | 3 | 01001000000000010 | 3 | 10010000000000100 | 3 | 01001000000000010 | 4 |
| 5 | 00000000010010000 | 3 | 01001000000000000 | 3 | 10100000100100 | 3 | 01001000000000000 | 2 |
| 6 | 00000000001001000 | 3 | 01001000000000100 | 3 | 10010000001001000 | 3 | 01001000000000100 | 2 |
| 7 | 00000000001001000 | 2 | 01000001000000000 | 2 | 10010000000001000 | 2 | 01000001000000000 | 4 |
| ... | ... |  | ... |  | ... |  | ... |  |
| 46 | 00010010000000010 | 1 | 00010010000000010 | 1 | 10010010000010000 | 3 | 10010010000010000 | 3 |
| 47 | 00100010000000001 | 1 | 00100010000000001 | 1 | 10010010000010010 | 1 | 10010010000010010 | 1 |
| 48 | 00100010000000010 | 1 | 00100010000000010 | 1 | 10010100000001000 | 3 | 01001000000001000 | 3 |
| 49 | 00000000010000010 | 1 | 01001000010000001 | 1 | 10010000001001000 | 1 | 01001000010001000 | 1 |
| 50 | 00000000100001001 | 1 | 01001000001000100 | 3 | 10010000001000100 | 1 | 01001000001000100 | 3 |
| 51 | 00000000100010010 | 1 | 01001000100010000 | 3 | 10010000100010000 | 3 | 01001000100010000 | 3 |
| 52 | 00000001000010001 | 1 | 01001000100010001 | 2 | 10010000100010001 | 2 | 01001000100010001 | 2 |
| 53 | 00000001000100010 | 1 | 01001000100100 | 2 | 10010010001000001 | 1 | 01001000100100 | 2 |
| 54 | 00000001000100001 | 1 | 01001001010000001 | 1 | 10010010010000001 | 1 | 01001001010000001 | 1 |
| ... | ... |  | ... |  | ... |  | ... |  |
| 86 | 00000000100000100 | 2 | 01000010000100 | 2 | 10001000001000100 | 2 | 01000010000100 | 2 |
| 87 | 00000000100100100 | 2 | 01001000100100 | 2 | 10001000010001000 | 2 | 01000010000100 | 2 |

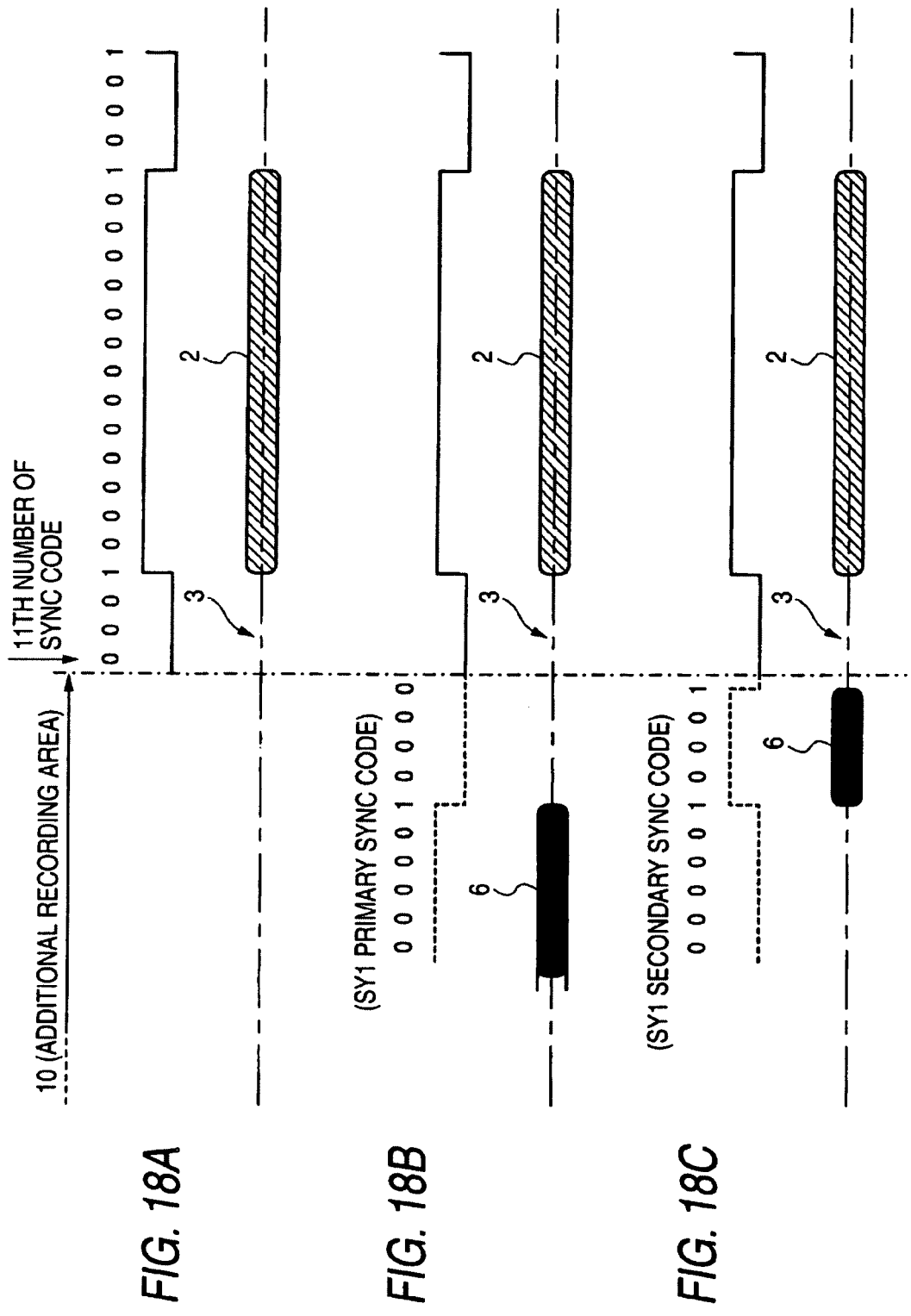

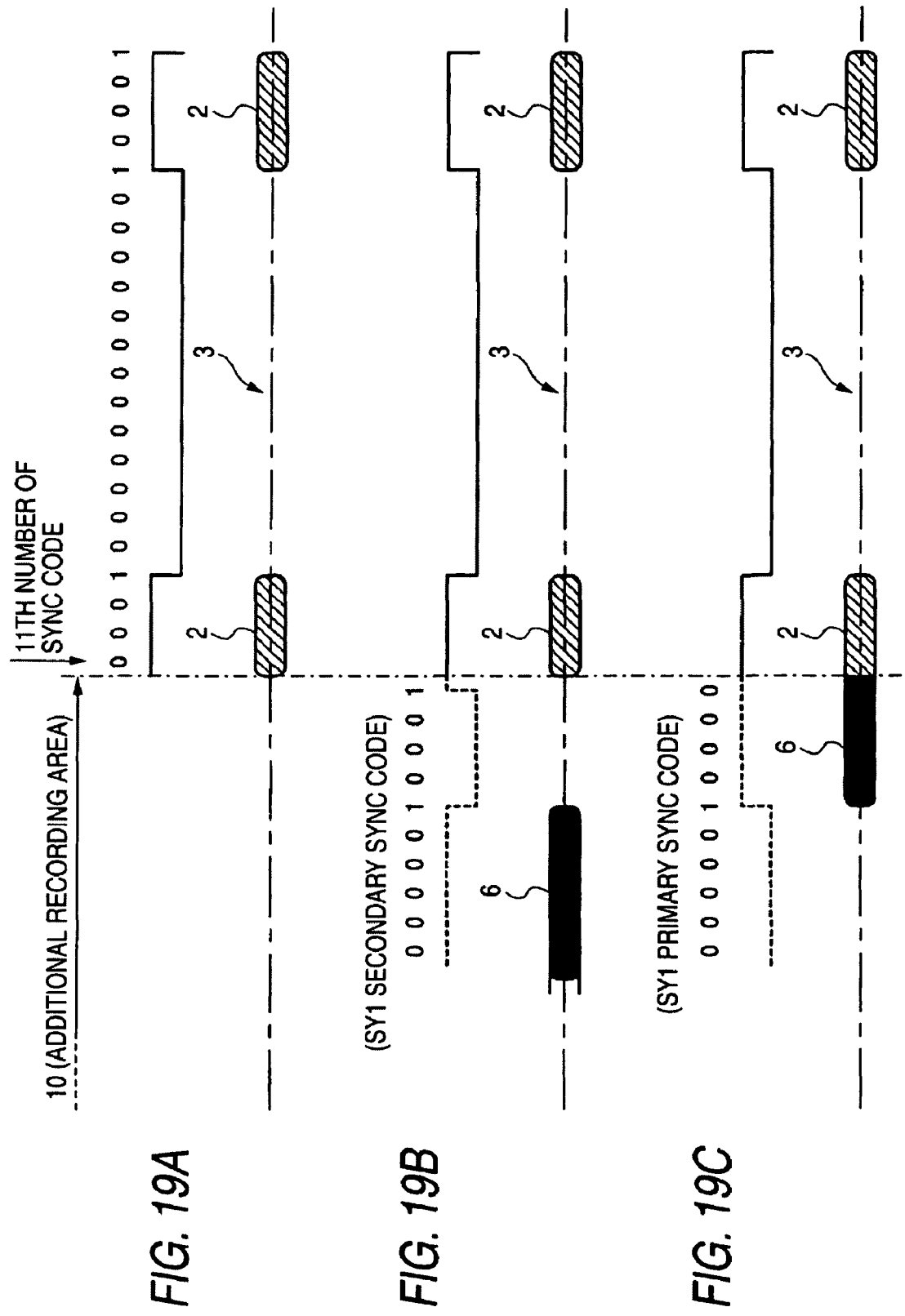

METHOD OF RECORDING DATA, METHOD OF MANUFACTURING READ-ONLY OPTICAL DISC, AND READ-ONLY OPTICAL DISC

CROSS REFERENCES TO RELATED APPLICATIONS

The present application claims priority to Japanese Patent Application JP 2007-155278 filed in the Japanese Patent Office on Jun. 12, 2007, the entire contents of which being incorporated herein by reference.

BACKGROUND

The present application relates to a method of recording data. Further, the invention relates to a method of manufacturing a read-only optical disc using the method of recording data and a read-only optical disc. Specifically, the present application relates to a technology that enables provision of additional supplementary information in a read-only optical disc medium to be manufactured.

JP-A-2001-135021, International Publication 01/008145 Pamphlet, and International Publication 02/101733 Pamphlet are cited as references.

In read-only optical disc media such as ROM (Read Only Memory) type CD (Compact Disc), DVD (Digital Versatile Disc), BD (Blu-ray disc: Registered Trademark), and HD-DVD (High Definition DVD), a lead-in area, a main data area, and lead-out area are formed from the inner circumference side toward the outer circumference side on the optical disc.

Information data of music, images, games, application programs, etc. is recorded in the main data area according to a predetermined recording modulation method. Further, in the lead-in area, various kinds of management information such as information for reproduction management of information data recorded in the main data area and physical information of the disc are recorded.

For example, these read-only optical disc media are utilized as means for providing contents by many content holders because of low production cost from their excellent mass productivity.

By taking DVDs (DVD-ROMs) as an example, the manufacturing process of read-only optical disc media is roughly divided into a mastering step of fabricating a master of optical discs with a laser beam, a molding and film-forming step of fabricating many disc substrates using a stamper fabricated from the optical disc master and forming films on the disc substrates, and a bonding step of bonding paired two 0.6-mm-thick optical discs with an adhesive having a predetermined thickness to form 1.2-mm-thick DVD discs.

At the molding and film-forming step, a concavo-convex pattern formed on the stamper is transferred onto the disc substrates in mass-production using the stamper. That is, recording data rows (pit rows) of embossed pits/lands as a concavo-concave shaped pattern are formed in a part as an information recording surface, and the recording data rows are formed in spiraled or coaxial recording tracks. On the information recording surface on which the pits/lands have been formed, the concavo-concave shape is coated with a metal alloy reflecting film.

After the disc is completed, a laser beam applied by a reproduction device is reflected by the reflecting film in the pits/lands part.

SUMMARY

The read-only optical discs are not intended for additional information recording after manufactured. However, recently, for management of read-only optical discs in which predetermined information data has been recorded or the like, a method of recording additional information (additional supplementary information) such as unique identification numbers with respect to each manufactured read-only optical disc and identification information according to contents has been desired.

Here, for additional information recording, it is conceivable that an area in which pits are not formed is provided as an additional recording area on the optical disk, an additional recording mark is formed in the additional recording area, and information is recorded thereon. However, it may be impossible to realize additional recording simply by recording additional supplementary information such as identification information.

In a DVD-ROM, the status in which additional supplementary information is recorded in the additional recording area should be adapted to the data format of the DVD-ROM.

For example, in the data format of the DVD-ROM, an error correction block (ECC block) is considered. The error correction block includes a plurality of sector data, and column-wise parity (hereinafter, referred to as "PO parity") and row-wise parity (hereinafter, referred to as "PI parity") as error correction codes. Further, the sector data includes main data (user data) and an error detection code (EDC) for the main data.

Here, the case where an area on the optical disc corresponding to a partial area of user data within a sector is used as an additional recording area and additional supplementary information is recorded in the additional recording area is considered.

When the additional supplementary information is written, the value of EDC within the sector naturally changes from the value before writing. Further, with respect to each ECC block, values of the PI parity and PO parity also change.

Since the read-only optical disc in which data is recorded with pit rows is obviously not rewritable, and thus, the EDC, PI parity, PO parity taking values that change when the additional supplementary information is written should be written when the additional supplementary information is written.

That is, in the case where additional supplementary information is written on the optical disc after pit rows are formed, additional information to be written includes not only additional supplementary information such as identification information but also EDC, PI parity, PO parity affected by the additional supplementary information.

Accordingly, it is desired that the efficient additional recording is executed in consideration of error detection code and error correction parity.

Furthermore, it is desired that a proper additional recording mark is formed while constraints are overcome on the data format such that the data rows corresponding to the additional recording mark written in the additional recording area satisfy the run length condition specified in the DVD system. However, very complicated calculation processing is necessary for satisfying the format constraints according to individual pieces of additional supplementary information, and the processing is a major factor to make additional recording of information very difficult.

Accordingly, there is a need for an additional recording technology, when additional information (additional supplementary information, and error detection code and error correction parity affected by additional recording) is recorded on a read-only optical disc on which pit rows of embossed pits have been formed, that can efficiently and easily realize adaptability to a data format.

A method of recording data according to an embodiment includes: a first recording step of recording data in a condition that, within a certain error correction block in a data format in which error correction blocks with n rows and m columns including at least main data, error detection code, and error correction parity are formed, an allocated location of additional supplementary information is set in a location in the same column as an allocated location of the error detection code, and an additional recording area is formed for recording the additional supplementary information and additional information containing the error detection code and the error correction parity necessary to be recorded according to the recording of the additional supplementary information; and a second recording step of recording the additional information in the additional recording area after the data recording at the first step is executed.

Further, the data format is a data formal of a DVD-system read-only optical disc, and the first recording step is executed to provide an immediately preceding part of the additional recording area with a code word of a data symbol "47" or "54" determined by a EFM+ conversion table.

Furthermore, a synchronization signal is formed by a SYNC ID and a SYNC body, and, at the second recording step, the SYNC ID part of the synchronization signal is recorded as the additional information at an ending part of the additional recording area.

A manufacturing method according to an embodiment is a method of manufacturing a read-only optical disc in which information is recorded with a pit row including embossed pits and lands. First, regarding recording data in a data format in which error correction blocks with n rows and m columns including at least main data, error detection code, and error correction parity are formed, within a certain error correction block, an allocated location of additional supplementary information is set in a location in the same column as an allocated location of the error detection code as a location within the error correction block. Then, the pit row based on the recording data is formed on the optical disc, and an additional recording area is formed on the optical disc as an area in which the pit row is not formed for recording additional information containing at least the additional supplementary information and the error detection code and the error correction parity necessary to be recorded according to the recording of the additional supplementary information. After the pit row is formed in this manner, the additional information is recorded in the additional recording area with an additional recording mark row including additional recording marks and lands.

Further, the pit row is formed in a concavo-convex shape coated with a reflecting film on the optical disc and the additional area is formed as a flat shape area coated with a reflecting film, and the additional information (the additional supplementary information and the error detection code and error correction parity affected thereby) is recorded with the additional recording mark row including the additional recording marks formed by eliminating or reducing the reflecting film of the additional recording area and the lands as flat portions coated with the reflecting film.

Furthermore, the additional information is recorded with the additional recording mark row having a head of the land in the additional recording area.

Specifically, in the case where the data format of the DVD-system read-only optical disc is considered as the data format, the pit row is formed to be a pit row according to a code word of a data symbol "47" or "54" determined by an EFM+ conversion table in an immediately preceding part to the additional recording area This is for recording the additional information with the additional recording mark row having a head of the land in the additional recording area.

Further, a synchronization signal is formed by a SYNC ID and a SYNC body, and the SYNC ID part of the synchronization signal is recorded as the additional information at an ending part of the additional recording area.

Furthermore, the pit row is formed with a head of the pit row immediately following the additional recording area fixedly unified into either an embossed pit or land.

A read-only optical disc according to an embodiment is a read-only optical disc including a pit row including embossed pits and lands with which information is recorded, wherein, regarding recording data in a data format in which error correction blocks with n rows and m columns including at least main data, error detection code, and error correction parity are formed, in a certain error correction block, the pit row is formed based on the recording data in which an allocated location of additional supplementary information is set in a location in the same column as an allocated location of the error detection code as a location within the error correction block, and an area for recording additional information containing at least the additional supplementary information and the error detection code and the error correction parity necessary to be recorded according to the recording of the additional supplementary information is formed as an additional recording area in which the pit row is not formed.

Further, a read-only optical disc according to an embodiment is a read-only optical disc including a pit row including embossed pits and lands with which information is recorded, wherein, regarding recording data in a data format in which error correction blocks with n rows and m columns including at least main data, error detection code, and error correction parity are formed, in a certain error correction block, the pit row is formed based on the recording data in which an allocated location of additional supplementary information is set in a location in the same column as an allocated location of the error detection code as a location within the error correction block, and, in an area in which the pit row is not formed, additional information containing at least the additional supplementary information and the error detection code and the error correction parity necessary to be recorded according to the recording of the additional supplementary information is recorded with an additional mark row including additional recording marks and lands.

The embodiments of the invention include the following technical elements.

First, the allocated location of the additional supplementary information is set in a location in the same column as the allocated location of the error detection code (EDC) as the location within the error correction block. This reduces the error correction parity (PO parity) affected by the recording of the additional supplementary information and improves the additional recording efficiency.

Further, since the additional information is recorded with the additional recording mark row having a head of the land in the additional recording area, the difficulty when the additional recording marks are formed is overcome.

Further, in the case of a DVD-ROM, the immediately preceding part to the additional recording area is a pit row according to the code word of the data symbol "47" or "54" determined by an EFM+ conversion table, the head of the additional recording area can be surely started with the land.

Furthermore, in the case where the synchronization signal is formed by a SYNC ID and a SYNC body as in a DVD- ROM, also the SYNC ID may be included in the additional information and the pit row immediately following is started from the SYNC body. Thereby, matching in synchronization signal between the additional mark row and the pit row can be obtained at the ending part of the additional recording area. Specifically, since the pit row is formed with a head of the pit row immediately following the additional recording area fixedly unified into either an embossed pit or land, the SYNC ID pattern can be easily selected when the SYNC ID is recorded as the additional information.

According to an embodiments, in the case where the additional information is recorded in the additional recording area after data recording is executed, for example, in the case where the additional information is recorded in the additional recording area after the pit row is formed, formation of the additional recording mark row can be realized efficiently and adaptively to the data format without exception regardless of additional information contents. Further, complicated arithmetic processing for adaptation to format is unnecessary.

Thereby, the additional recording of information in various optical discs and recording of additional supplementary information such as identification information with respect to each individual in read-only optical discs can be performed more easily. Further, the embodiments are preferable for widespread use of the information additional recording technology for read-only optical discs.

Additional features and advantages are described herein, and will be apparent from the following Detailed Description and the figures.

BRIEF DESCRIPTION OF THE FIGURES

FIG. 9 is a diagram for explanation of the ECC block structure after interleaving.

FIG. 13A is a diagram for explanation of the case where data symbol "54" is recorded immediately preceding to the additional recording area.

FIG. 13B is a diagram for explanation of the case where data symbol "54" is recorded immediately preceding to the additional recording area.

FIG. 14 is a diagram for explanation of a main conversion table for EFM+ modulation.

FIG. 15 is a diagram for explanation of a sub-conversion table for EFM+ modulation.

FIG. 18A is a diagram for explanation of a recording status at the ending part of the additional recording area of an embodiment.

FIG. 18B is a diagram for explanation of a recording status at the ending part of the additional recording area of an embodiment.

FIG. 18C is a diagram for explanation of a recording status at the ending part of the additional recording area of an embodiment.

FIG. 19A is a diagram for explanation of a recording status at the ending part of the additional recording area of an embodiment.

FIG. 19B is a diagram for explanation of a recording status at the ending part of the additional recording area of an embodiment.

FIG. 19C is a diagram for explanation of a recording status at the ending part of the additional recording area of an embodiment.

DETAILED DESCRIPTION

An embodiment will be explained by taking a DVD-system read-only optical disc as an example. Specifically, regarding an read-only optical disc as a DVD-ROM, the case where information having relatively low capacity such as an individual ID (e.g., about 100 bytes) is recorded as additional supplementary information will be described. The explanation will be made in the following order: according to an embodiment with reference to the figures.

[1. Manufacturing Process of Read-only Optical Disc and Additional Recording with Perforated Marks]
[2. ECC Block Configuration and Allocation of Additional Supplementary Information]
[3. Matching at Starting Part of Additional Recording Area]
[4. Matching at Ending Part of Additional Recording Area]
[5. Advantages of Embodiment and Modified Examples]

1. Manufacturing Process of Read-Only Optical Disc and Additional Recording with Perforated Marks First, a manufacturing process of a read-only optical disc 90 of the embodiment will be described with reference to FIG. 1.

Figure 1:
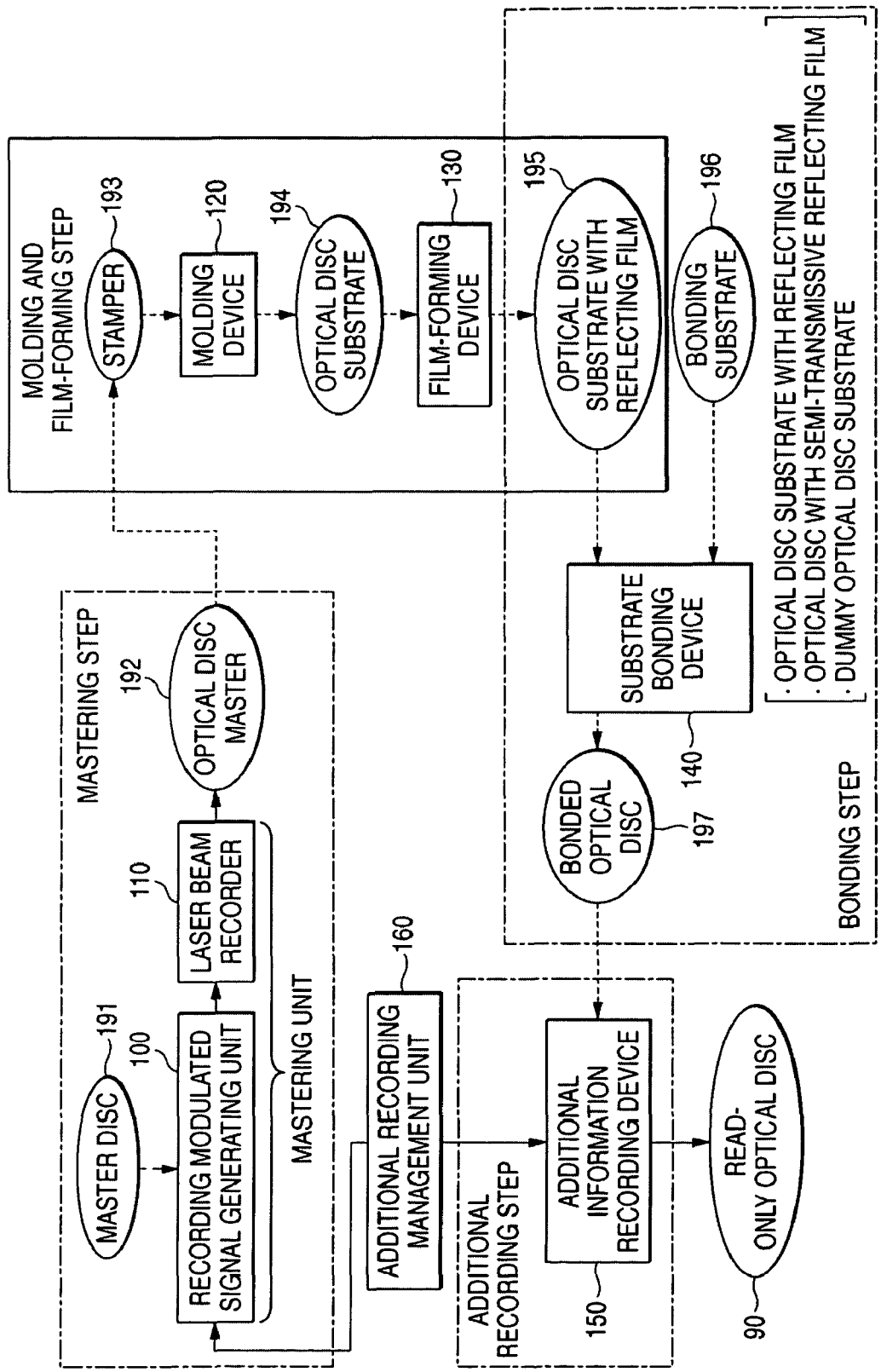
FIG. 1 is a diagram for explanation of a manufacturing process of a disc of an embodiment.

FIG. 1 shows a manufacturing process of a read-only optical disc as a DVD of the embodiment. The manufacturing process in this example is roughly divided as shown in the chart into a mastering step of fabricating an optical disc master with a laser beam, a molding and film-forming step of fabricating many disc substrates using a stamper formed from the optical disc master and forming films on the disc substrates, a bonding step of bonding paired two 0.6-mm-thick optical discs with an adhesive having a predetermined thickness to form 1.2-mm-thick DVD discs, and an additional recording step of recording additional information on the individual bonded optical discs. The additional information includes additional supplementary information as information desired to be individually added such as identification information, for example, and error detection code (EDC) and error correction parity necessary to be recorded according to the recording of the additional supplementary information.

As below, the respective steps will be explained.

The mastering step is a step of manufacturing an optical disc master 192 based on information data recorded on a master disc 191. At the step, a mastering device having a recording modulation signal generating unit 100 and a laser beam recorder 110 is used.

The recording modulation signal generating unit 100 reproduces the master disc 191, reads information data to be recorded, EFM+ (Eight to Fourteen Modulation plus)-modulates signals of the read information data, and outputs the generated EFM+ signals to the laser beam recorder 110.

The optical disc master 192 is formed by applying a photoresist as a photosensitive material on a glass plate. The laser beam recorder 110 applies a laser beam onto the optical disc master 192 according to the supplied EFM+ signals for exposure of a pit pattern based on the EFM+ signals. Then, the photoresist film is developed, and, With a positive resist, the exposed portions are melted and a concavo-convex pattern is formed on the photoresist film and a pit pattern (concavo-convex shapes of pits/lands) according to a predetermined format is formed on the surface of the optical disc master 192.

As described above, the recording modulation signal generating unit 100 generates EFM+ signals based on the signals read out from the master disc 191 and sends them to the laser beam recorder 110, and further, unmodulated signals are inserted into certain durations of part of the continuously sent EFM+ signals according to instructions from an additional recording management unit 160.

During the durations of unmodulated signals, the laser beam is off in the laser beam recorder 110 is off. That is, through insertion of unmodulated signals into the EFM+ signals, unexposed sections are formed on the optical disc master 192. All of the sections become lands and flat shape areas on which no concavo-convex shape is formed, aid the areas are used as additional recording areas, which will be described later.

On the basis of the optical disc master 192, a mold called a stamper 193 onto which the pit pattern of the optical disc master 192 has been reversely transferred is fabricated. Naturally, the flat shape areas as additional recording areas are also formed on the stamper 193.

Then, at the molding and film-forming step, a molding device 120 fabricates an optical disc substrate 194 using the stamper 193. On the optical disc substrate 194, the concavo-convex pattern formed on the optical disc master 192 is transferred and the pit pattern is formed.

As a method of fabricating the optical disc substrate 194, compression molding, injection molding, light curing, etc. are known.

On the optical disc substrate 194 onto which the pit pattern has been transferred from the stamper 193, a film forming device 130 sequentially deposits a coating film such as a reflecting film, and thereby, an optical disc substrate with reflecting film 195 is formed.

Then, at the bonding step, the above optical disc substrate with reflecting film 195 and a bonding substrate 196 are bonded.

As the bonding substrate 196, the optical disc substrate with reflecting film fabricated in the same process as above, or an optical disc on which a semi-transmissive reflecting film has been formed, or a dummy optical disc substrate with no reflecting film coating is used.

A substrate bonding device 140 bonds one of the bonding substrate 196 of them to the optical disc substrate with reflecting film 195 to manufacture a bonded optical disc 197.

As an adhesion technique when bonding, a technique using an ultraviolet curing adhesive, a technique using a sheet with adhesive, etc. are known.

In a DVD of the related art, the bonded optical disc 197 is a DVD as a completed product. However, in this example, additional recording areas with no pit pattern are provided on the partial sections on the recording track on which the pit pattern (pit rows including embossed pits and lands) have been formed.

Figure 2:
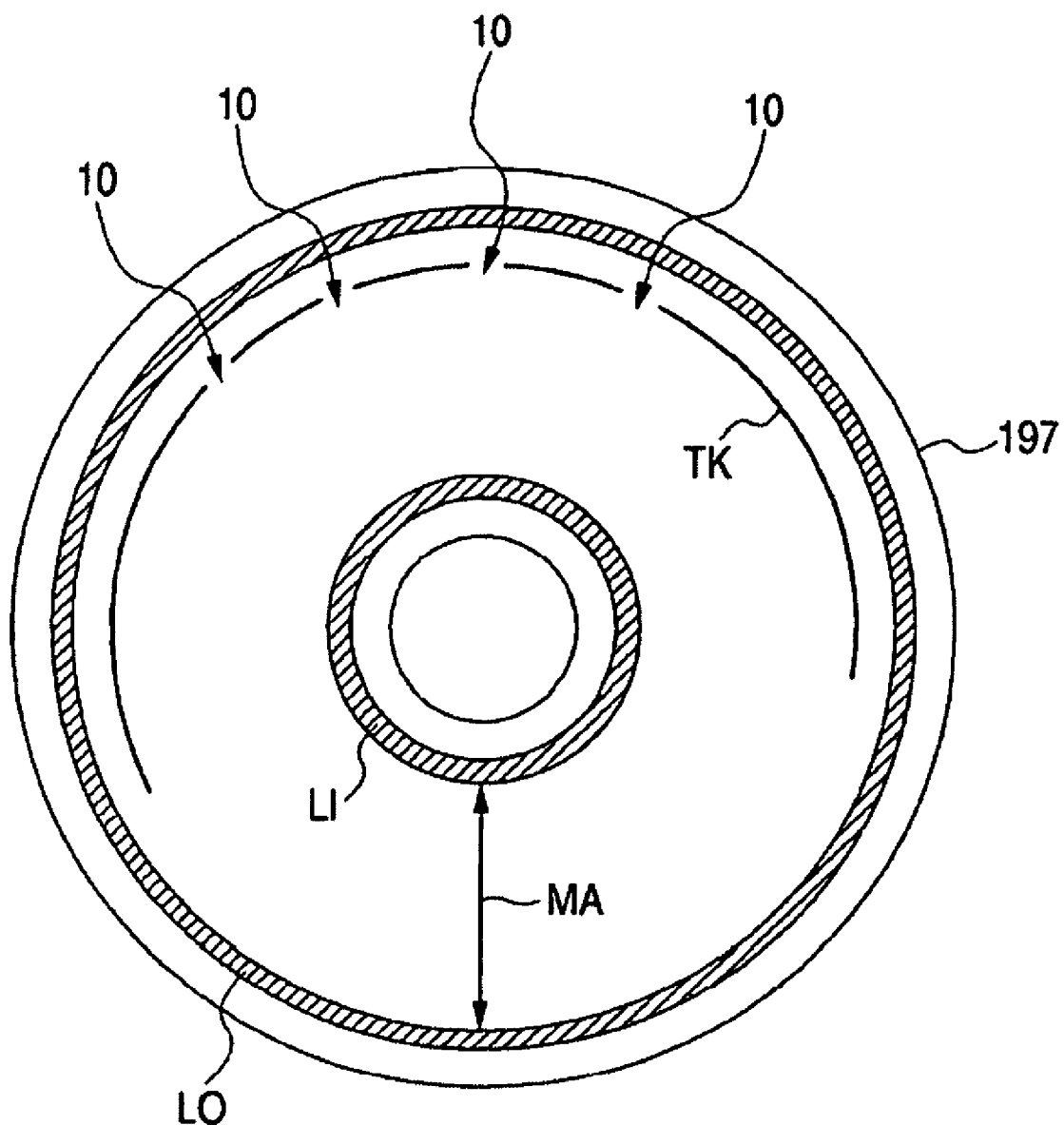
FIG. 2 is a diagram for explanation of a stage of a bonded optical disc in the manufacturing process of an embodiment.

FIG. 2 schematically shows the bonded optical disc 197. As the area configuration on the disc, from the inner circumference side, lead-in area L1 in which management information has been recorded, main data area MA in which content data has been recorded, and lead-out area LO are formed.

These lead-in area L1, main data area MA, and lead-out area LO are areas in which information is basically recorded with pit rows including embossed pits and lands. That is, a recording data row of pits/lands according to the EFM+ signals is formed as a spiral recording track, for example.

Here, a certain track TK within the main data area MA in which additional recording areas 10 are partially formed is shown. Though the schematic view is only for explanation and the practical allocation and size along the line of the additional recording areas 10 are not necessarily the same as those shown in the drawing, the additional recording areas 10 are formed as flat shape areas with reflecting film in part of the recording track of the pit rows.

In which area within the main data area MA the additional recording areas 10 are formed is not especially limited. Further, the additional recording areas 10 may be formed within the lead-in area L1 or the lead-out area LO. Furthermore, it is also conceivable that the additional recording areas 10 are provided at the inner circumference side of the lead-in area L1, or at the outer circumference side of the lead-out area LO.

In the case of the example, the bonded optical disc 197 is not a completed DVD because unrecorded areas are left as the additional recording areas 10 as described above. Accordingly, the additional recording step is executed on the bonded optical disc 197.

At the additional recording step, an additional information recording device 150 writes additional information in the additional recording areas on the bonded optical disc 197. For example, identification information, error detection code, error correction parity, etc. different from one optical disc to another are written as additional information.

In this case, the additional information recording device 150 is instructed on location information (address) from the additional recording management unit 160 and provided with additional information to write, and writes the additional information.

The additional information recording device 150 performs writing by the method of EFM+-modulating the additional information, applying high-power laser pulse for recording according to the EFM+ signal, and eliminating or reducing the reflecting film in the additional recording areas to form a perforated mark.

The configuration of the additional information recording device 150 will be described later with reference to FIG. 7.

When the additional recording step is completed, the manufacturing of the read-only optical disc 90 is completed. The read-only optical discs 90 mass-produced in the above described process are optical discs in which the same contents (music, images, games, application programs, etc.) are recorded, but unique additional information is individually recorded.

The additional recording step may be performed within the manufacturing factory where the molding and film-forming step and the bonding step are executed, or in another facility, store, etc.

For example, a content holder (a dealer who provides contents and requests fabrication of discs or the like) may request delivery of the bonded optical discs 197 and the content holder may record additional information using their additional information recording device 150.

Further, it is also conceivable that, in a store, the bonded optical discs 197 are displayed for sale and, when a customer buys the discs, additional information are written therein by the additional information recording device 150 installed in the store and the discs are handed to the customer.

The embossed pit rows and perforated marks formed on the read-only optical disc 90 manufactured as above will be explained.

Figure 3A:
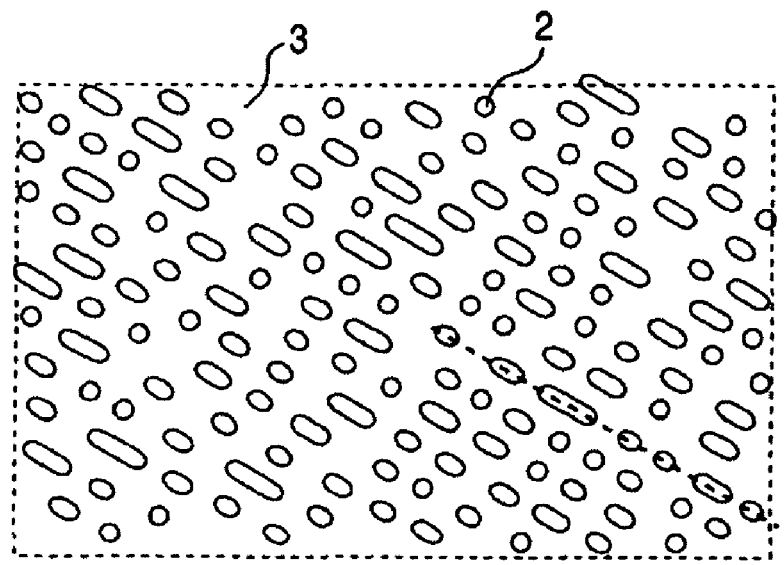
FIG. 3A is a partially enlarged view of a read-only optical disc of an embodiment.
Figure 3B:
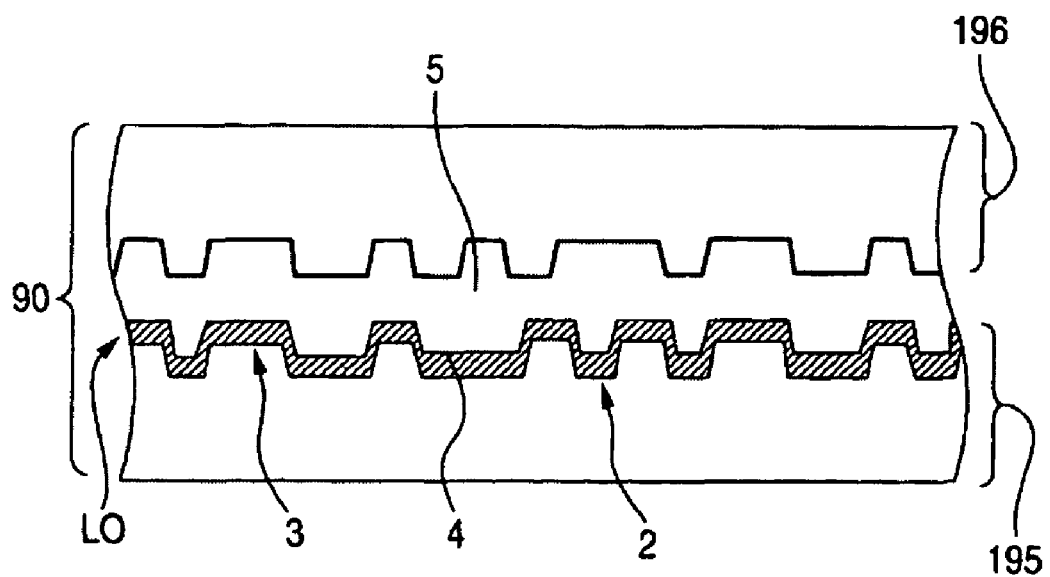
FIG. 3B is a schematic sectional view of the read-only optical disc of an embodiment.

FIG. 3A is a partially enlarged view showing a part in which recording tracks are produced as typical pit rows of embossed pits/lands, and further, FIG. 3B is a schematic sectional view of the part shown by the broken line in FIG. 3A.

As seen from FIG. 3B, each read-only optical disc 90 is formed by bonding the optical disc substrate with reflecting film 195 made of polycarbonate having a thickness of 0.6 mm and the bonding substrate (dummy optical disc substrate) 196 with an adhesive 5 (e.g., an ultraviolet curing resin or adhesive sheet), for example, and has a thickness of 1.2 mm.

In this case, one principal surface of the optical disc substrate with reflecting film 195 is used as information recording surface L0, and the information recording surface L0 is formed as a concavo-convex pattern of pits 2 and lands 3. Further, reflecting films 4 are formed on the surface of the pits 2 and lands 3.

The concavo-concave relation between the pits 2 and lands 3 may be opposite.

The bonding substrate 196 to be bonded to the optical disc substrate with reflecting film 195 is a dummy optical disc substrate (a disc substrate with no reflecting film coating) in FIG. 3B, however, as described above, an optical disc substrate on which a reflecting film has been formed or an optical disc on which a semi-transmissive reflecting film has been formed may be used as the bonding substrate 196.

The adhesive 5 is generally transmissive, but may not be transmissive depending on the structure. When the bonding substrate 196 bonded to the optical disc substrate with reflecting film 195 has a reflecting film or semi-transmissive reflecting film, the bonding surface becomes a surface having the reflecting film or semi-transmissive reflecting film formed thereon.

Figure 4A:
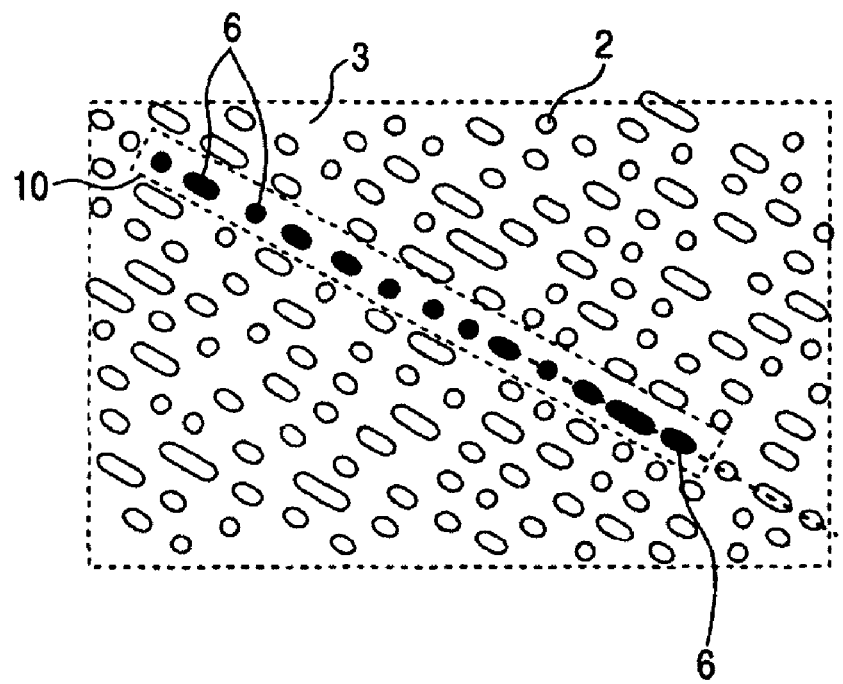
FIG. 4A is a partially enlarged view including an additional recording area of the read-only optical disc of an embodiment.
Figure 4B:
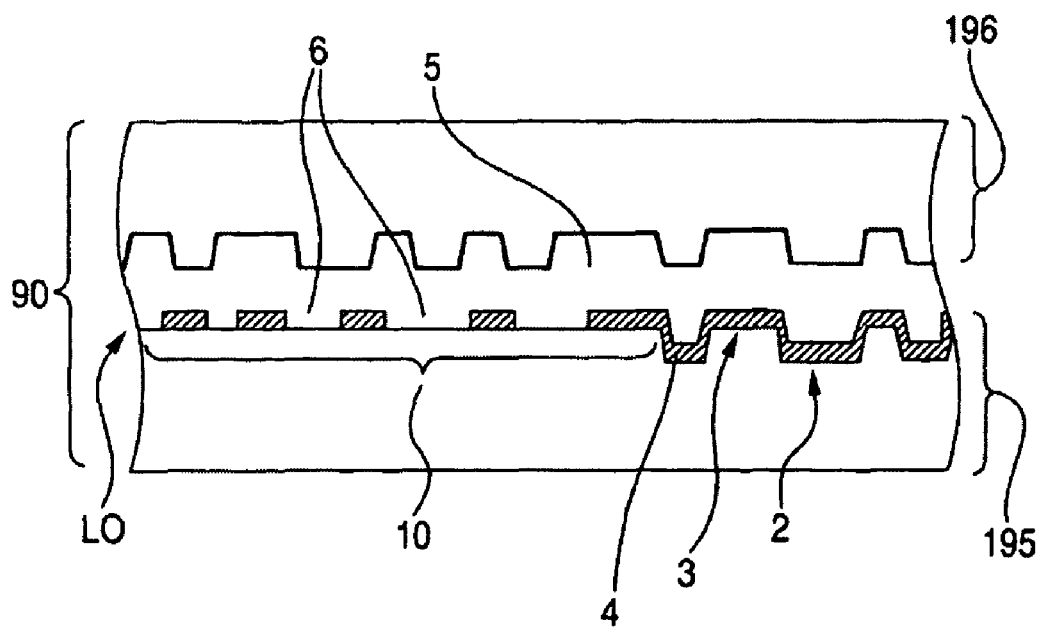
FIG. 4B is a schematic sectional view including the additional recording area of the read-only optical disc of an embodiment.

FIG. 4A is an enlarged view of a part in which perforated marks are formed, and further, FIG. 4B is a schematic sectional view of the part shown by the broken line in FIG. 4A.

In the example of FIG. 4A, a partial area within one track formed by a pit row of embossed pits and lands is used as an additional recording area 10, and a recording data row of perforated marks 6 formed at the above described additional recording step is formed therein. That is, additional information unique to the disc is recorded as the recording data row of the perforated marks 6.

For convenience of explanation, the recording data row of the perforated marks 6 and the lands 3 is referred to as "additional recording mark row" for distinction from the pit row of the embossed pits 2 and the lands 3.

As shown in FIG. 4B, the part where the additional recording mark row is formed basically has the same layer structure as that shown in FIG. 3B, but the perforated marks 6 are formed on part of the information recording surface L0. That is, the perforated marks 6 are formed with little reflecting films exist thereon by elimination or reduction of the metal alloy reflecting films 4.

Figure 5A:
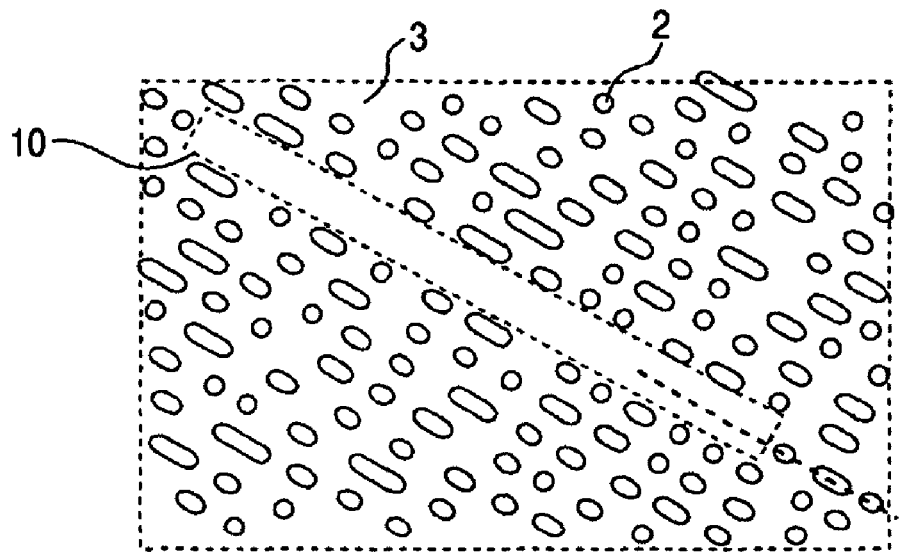
FIG. 5A is a partially enlarged view including the additional recording area before additional information recording of the read-only optical disc of an embodiment.
Figure 5B:
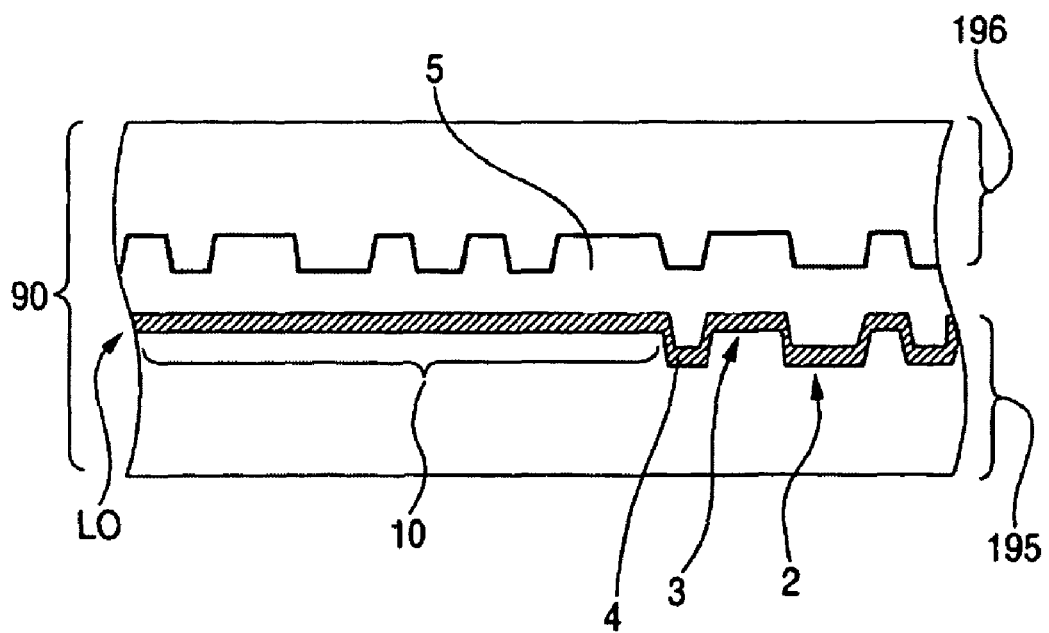
FIG. 5B is a schematic sectional view including the additional recording area before additional information recording of the read-only optical disc of an embodiment.

FIGS. 5A and 5B show the status corresponding to FIGS. 4A and 4B before additional information is recorded at the above described additional recording step.

As shown in FIG. 5A, the additional recording area 10 is a flat shape area as an unmodulated section in which no concavo-concave pattern of pits 2 and lands 3 is formed. As seen from FIG. 5B, the additional recording area 10 exists in the same plane as that of the lands 3 and forms a so-called mirror portion coated with the reflecting film 4.

In the additional recording area 10, additional information is recorded at the additional recording step.

That is, the above described additional information recording device 150 is prepared as a dedicated recording device using a high-power red semiconductor laser, for example, and has a function of emitting high-power laser pulse for recording in a desired section. The device performs recording in the additional recording area 10 in the status of FIGS. 5A and 5B and forms perforated marks 6 as in FIGS. 4A and 4B. For the modulation of light emission pattern in this regard, EFM+ signals are used as the same modulation method as the modulation corresponding to the embossed pit rows.

Figure 6:
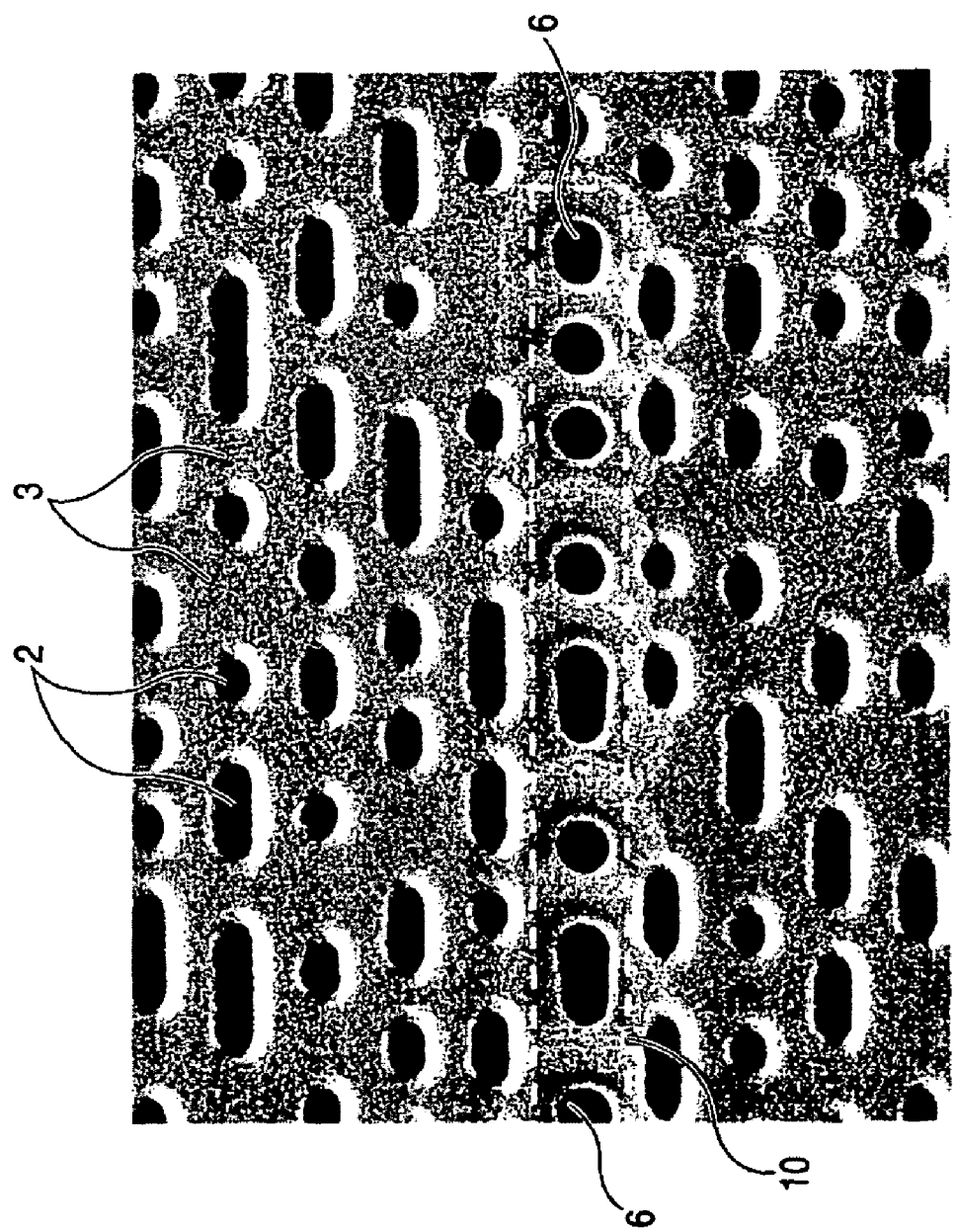
FIG. 6 is a diagram for explanation using an SEM photograph of an additional information recording part of the read-only optical disc of an embodiment.

FIG. 6 shows a sample on which perforated marks 6 are formed as recording of additional information in the additional recording area 10 in the read-only optical disc 90 by entering a high-power laser. This is an SEM (scanning electron microscopic) observation photograph of the additional recording area 10 with the perforated marks 6 formed therein.

For SEM observation, the optical disc substrate with reflecting film 195 and the bonding substrate 196 (dummy optical disc substrate) are separated at the bonding surface and an electron beam is entered into the part where the reflecting films 4 are bared. For the reflecting film 4, an Al alloy of an Al-base alloy containing about 1 atomic percent Fe and about 5 atomic percent Ti is used.

As seen from FIG. 6, the metal alloy reflecting films formed on the additional recording area 10 are eliminated or reduced according to the modulated signals of the additional information and oval holes are perforated, and perforated marks 6 corresponding to the pits are neatly formed.

A configuration example of the additional information recording device 150 for recording an additional recording mark row of the perforated marks 6 will be explained with reference to FIG. 7.

Figure 7:
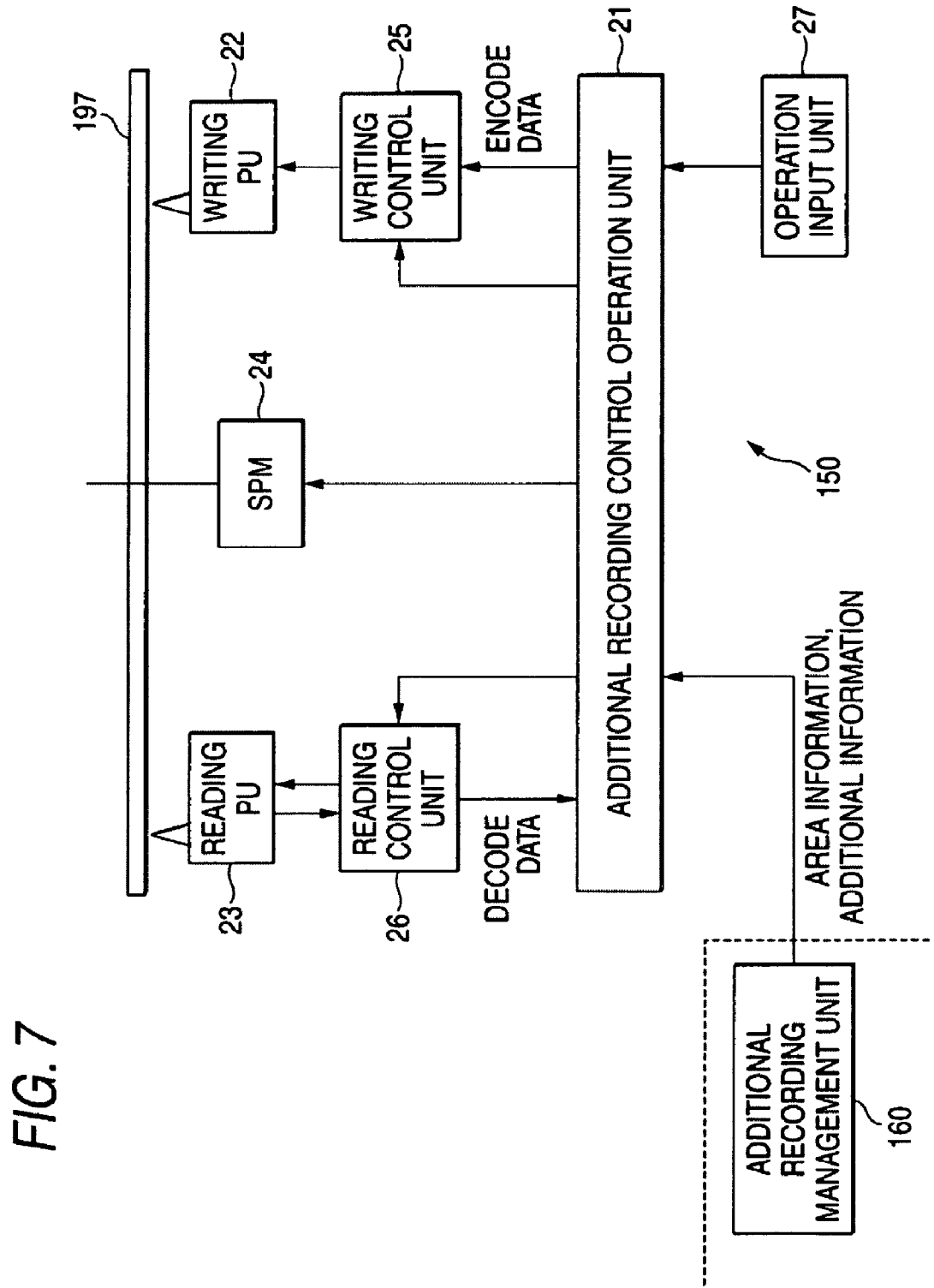
FIG. 7 is a block diagram of an additional information recording device of an embodiment.

FIG. 7 is a block diagram of the additional information recording device. The additional information recording device 150 has an additional recording control operation unit 21, a writing pickup 22, a reading pickup 23, a spindle motor 24, a writing control unit 25, a reading control unit 26, and an operation input unit 27.

The bonded optical disc 197 in which additional information is to be written at the additional recording step is mounted on a turntable (not shown) and rotationally driven by the spindle motor 24.

In and from the bonded optical disc 197, the additional information is recorded by the writing pickup 22 and the recorded data is read by the reading pickup 23.

The writing pickup 22 outputs a laser having a wavelength of 660 nm, for example. The laser power can be changed according to the instruction from the writing control unit 25, and the maximum output is about 100 mW, for example. By the laser from the writing pickup 22, the perforated marks 6 with eliminated or reduced reflecting films 4 are formed on the bonded optical disc 197.

The reading pickup 23 outputs a laser having a wavelength of 635 or 650 nm, for example. The laser power is about 0.2 mW. The reading pickup 23 receives the reflected light of the output laser and obtains signals of the information read from the bonded optical disc 197 from the received reflected light information.

The writing control unit 25 controls the operation of the writing pickup 22 to write the supplied data in the bonded optical disc 197 by the writing pickup 22. That is, the unit generates a laser drive signal based on the supplied data (encode data of the additional information) and executes the laser output of the writing pickup 22. Further, simultaneously, the unit controls the laser power according to the instruction from the additional recording control operation unit 21. Further, the writing control unit 25 controls writing position, focus, and the like of the writing pickup 22 and executes recording of perforated marks 6 in predetermined positions according to the instruction from the additional recording control operation unit 21.

The reading control unit 26 allows the reading pickup 23 to execute laser output for reading information from the bonded optical disc 197, performs decoding processing of the information read as reflected light information, and thereby, obtains decode data as additional information. Further, the reading control unit 26 controls reading position, focus, and the like of the reading pickup 23 and executes reading of information from the bonded optical disc 197.

The additional recording control operation unit 21 performs drive control of the spindle motor 24, operation control on the writing control unit 25, and operation control on the reading control unit 26 as control of trial writing and additional information recording operation executed as the additional information recording device 150.

As described above with reference to FIG. 1, the additional information and area information to be written in the additional recording area 10 are supplied from the additional recording management unit 160, and the additional recording control operation unit 21 loads them and controls execution of the operation at the additional recording step. In this case, the area information is location information (address) of the additional recording area 10.

The additional recording control operation unit 21 controls execution of the trial writing recording and additional information recording operation according to the information from the additional recording management unit 160 and operation input of an operator using the operation input unit 27.

When recording the additional information, the additional recording control operation unit 21 instructs the writing control unit 25 to access the additional recording area 10 and moves the writing pickup 22 to the additional recording area 10. Then, the unit 21 encodes the additional information and supplies the encode data to the Writing control unit 25, and also gives an instruction for recording conditions of the laser power for writing or the like. Thereby, the writing control unit 25 drives the writing pickup 22 to form the perforated marks 6 in the additional recording area 10 based on the encode data as the additional information.

Further, when recording the additional information, the additional recording control operation unit 21 also instructs the reading control unit 26 to access the additional recording area 10 and instructs reproduction by the reading pickup 23. That is, the unit 21 gives an instruction for reproduction of the part of the perforated marks 6 recorded by the writing pickup 22. Thereby, the additional information is read by the reading pickup 23 and the decode data is loaded in the additional recording control operation unit 21 by the reading control unit 26. The additional recording control operation unit 21 makes evaluations of the decoded data by detecting the error rate or the like, and determines whether the additional information has been properly recorded or not.

2. ECC Block Configuration and Allocation of Additional Supplementary Information As described above, the read-only optical disc is manufactured as a DVD in which additional information is recorded. As below, a method for properly realizing the additional information recording will be described in view of the data format of the DVD system.

First, here, ECC block configuration and allocation of additional supplementary information will be explained.

Figure 8A:
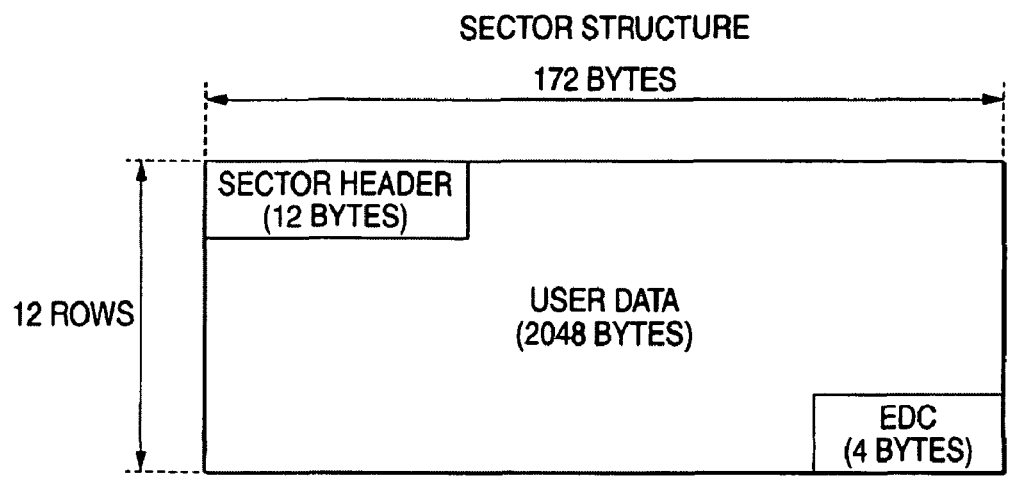
FIG. 8A is a diagram for explanation of a sector structure of a DVD.

FIG. 8A shows a structure of a sector as the minimum unit of a data structure in the DVD data format.

The sector is a data unit of 2064 bytes in 172 bytes×12 rows. One sector includes a sector header of 12 bytes, user data of 2048 bytes, and EDC (error detection code) of four bytes.

In the sector header of 12 bytes, attribute information such as sector format type, tracking system, area information (distinction among lead-in area L1, main data area MA, and lead-out area LO), data type, and layer number, address information, etc. are recorded.

The user data area of 2048 is used for recording main recording data.

The EDC of four bytes is an error detection code within the sector.

Figure 8B:
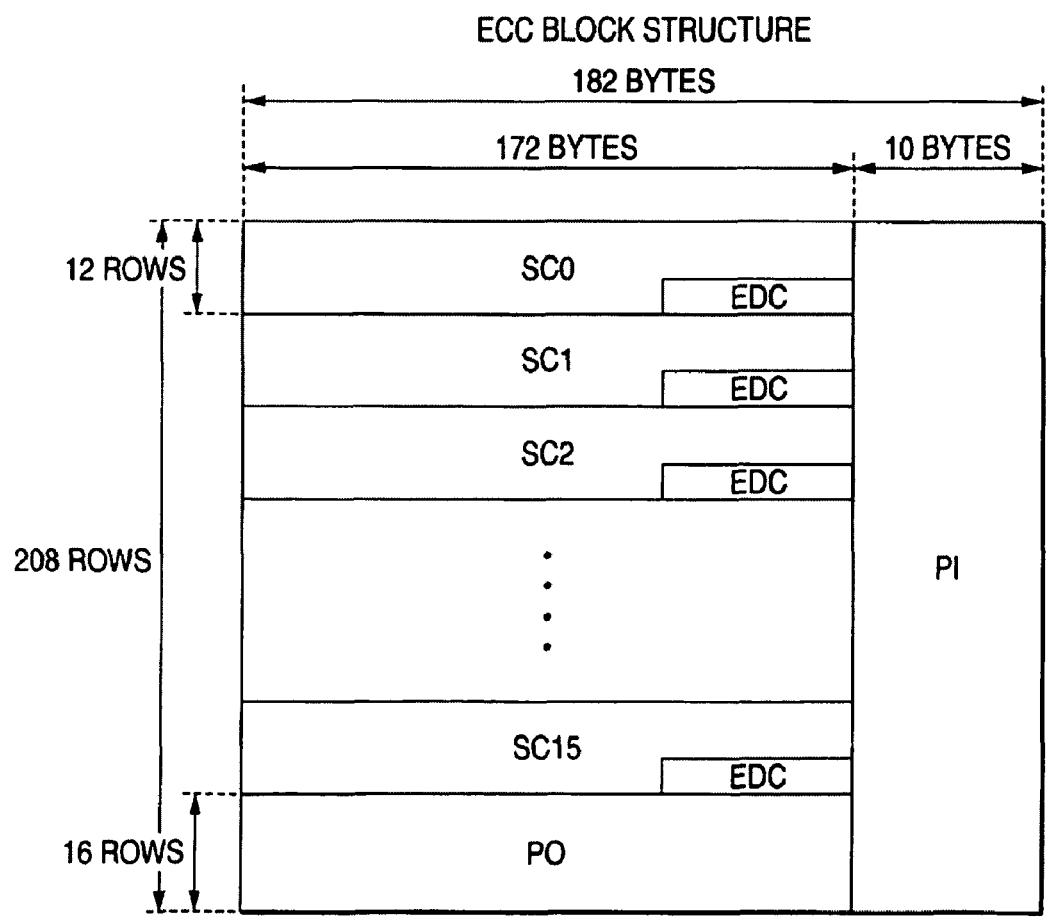
FIG. 8B is a diagram for explanation of a ECC block structure of the DVD.

An ECC block as one recording unit is formed by gathering 16 of such sectors. FIG. 8B shows an ECC block structure.

To 16 sectors of sectors SC0, SC1 . . . SC15, PO parity of 172 bytes×16 rows is added as column-wise parity.

Furthermore, to sectors SC0, SC1 . . . SC15 and the respective rows of the PO parity, row-wise parity (PI parity) of 10 bytes for each is added.

The 182 bytes×208 rows form the ECC block.

The ECC block is interleaved as shown in FIG. 9. That is, the respective 16 rows of the PO parity are incorporated into the last rows of the respective sectors SC0 to SC15 as shown by the shaded parts in the drawing. The respective sectors of 182 bytes×13 rows in which the rows of the PO parity have been incorporated are used as recording sectors rSC0, rSC1 . . . rSC15.

Figure 11:
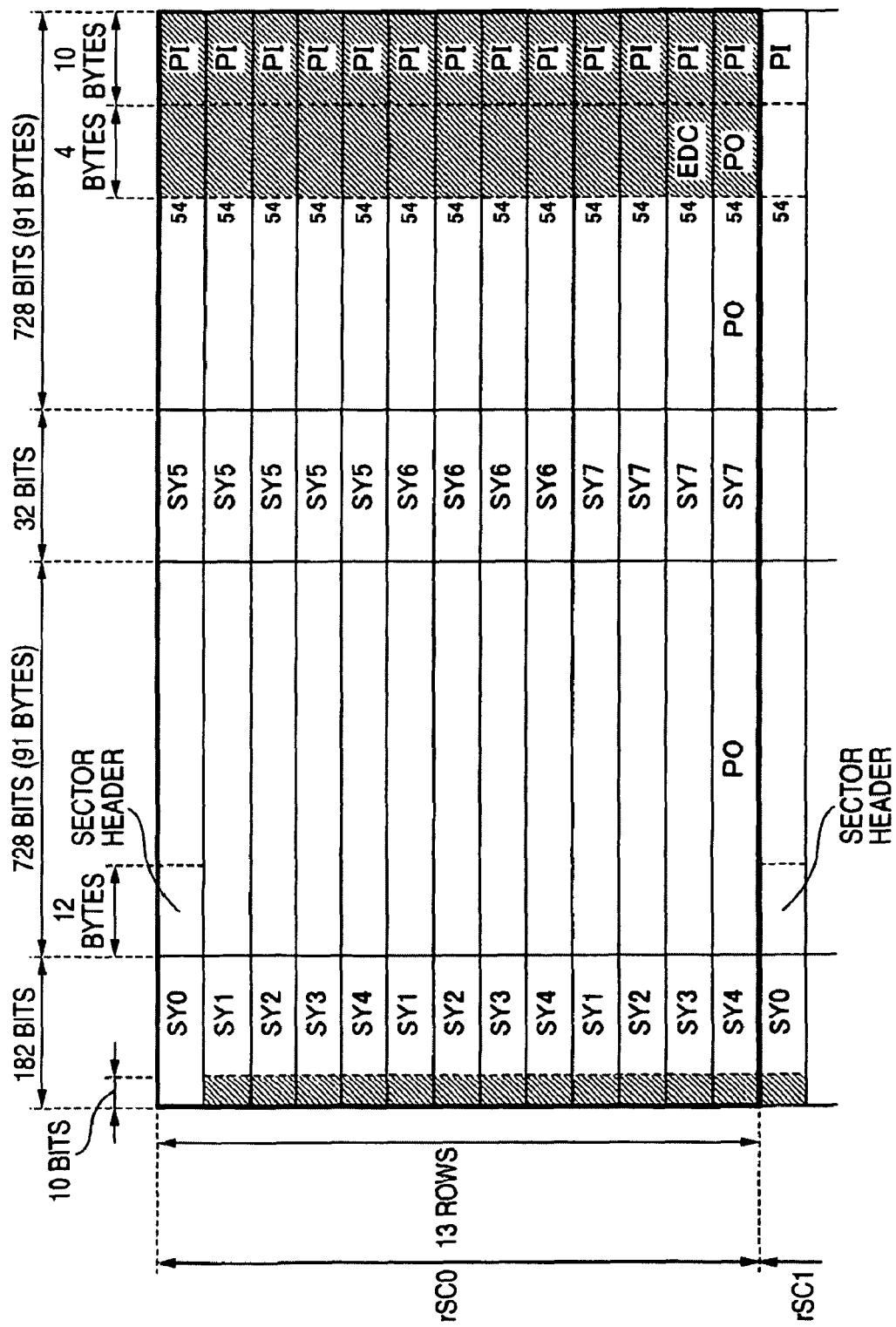
FIG. 11 is a diagram for explanation of an additional recording area in a recording sector of an embodiment.

Furthermore, FIG. 11 shows a part of the recording sector rSC0. In the respective recording sectors rSC0, rSC1 . . . rSC15, one row of 182 bytes is divided into groups of 91 bytes, and 32-bit synchronization signals SY (SY0 to SY7) are added to the units of 91 bytes.

The status in FIG. 11 is a data structure to be finally recorded in a disc. That is, each one byte (8-bit) data symbol of the data structure in FIG. 11 is converted into 16 bits by EFM+ modulation, and pit rows are formed based on logic inversion of NRZI format of the EFM+ modulation signals.

The structure in FIG. 11 includes the respective rows sequentially continuous in the track line direction on the optical disc. That is, on the optical disc, data is recorded in the track line direction in the sequence that the synchronization signal SY0 in the first row→91 bytes containing the sector header of the first row→the synchronization signal SY5 in the first row→91 bytes containing the PI parity of the first row→the synchronization signal SY1 in the second row→91 bytes of the second row→the synchronization signal SY5 in the second row→91 bytes containing the PI parity of the second row→the synchronization signal SY2 in the third row→ . . . .

Figure 10:
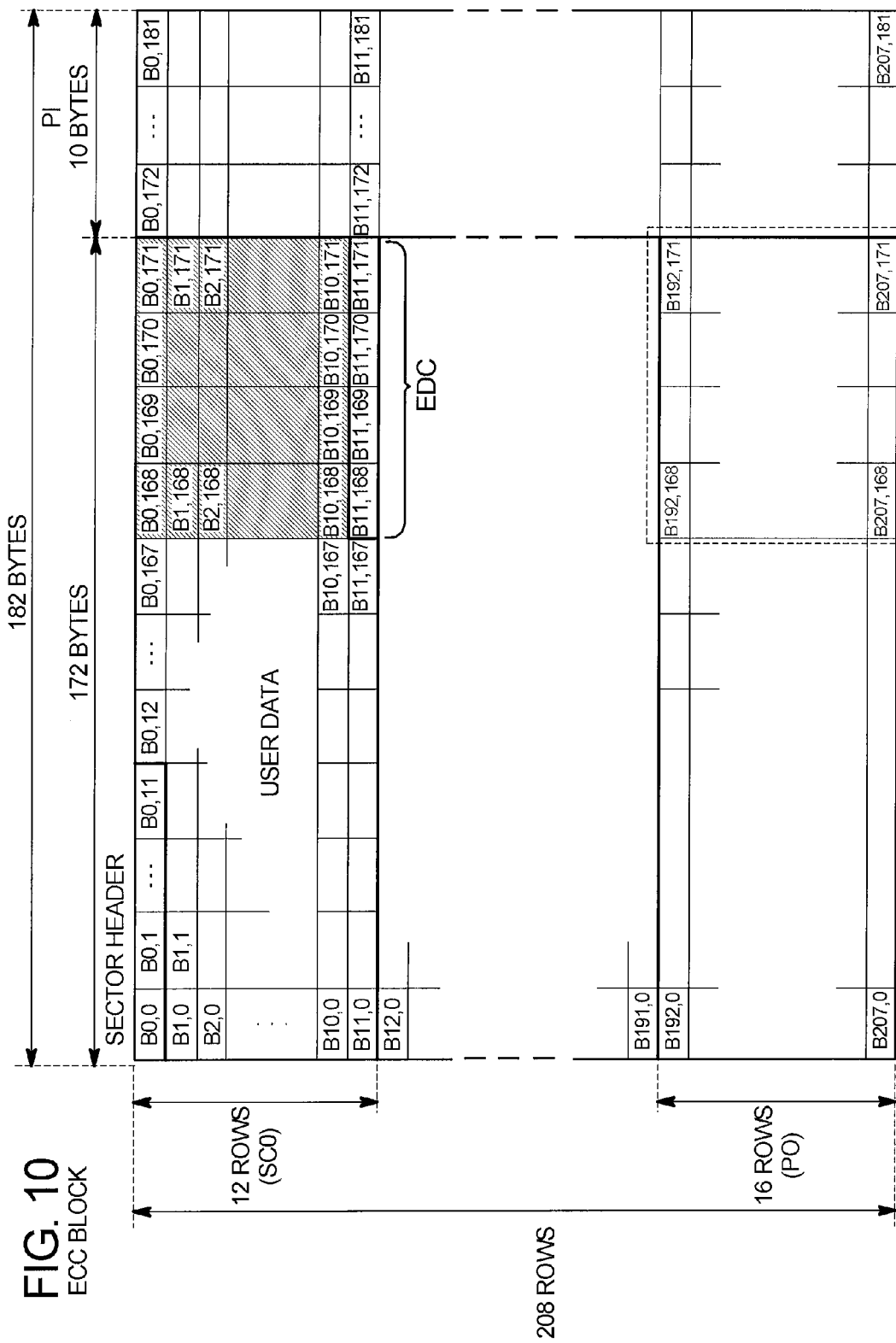
FIG. 10 is a diagram for explanation of an allocated location of additional supplementary information within the ECC block of an embodiment.

Here, the allocation of additional supplementary information within the ECC block will be described. FIG. 10 shows the ECC block configuration in FIG. 8B by byte locations.

The ECC block of 182 bytes×208 rows has byte locations of B0,0 to B207,181.

The data of the first sector SC0 within the ECC block is allocated in the byte locations B0,0 to B11,181 including the PI parity.

The B0,0 to B0,11 are used for the sector header.

Further, 2048 bytes of B0,12 to B0,171, B1,0 to B1,171, B2,0 to B2,171, . . . B10,0 to B10,171, B11,0 to B11,167 are used for user data.

Further, B11,168 to B11,171 are used for EDC.

Then, each 10 bytes of PI parity are allocated as B0,172 to B11,181 in the respective rows.

In the byte locations from B12,0, the sectors SC1 to SC15 are allocated in the same structure. Further, each 16 bytes of PO parity are allocated in byte locations B192,0 to B207,171 in the respective columns.

In the example, the recording area for additional supplementary information is secured within the user data of one or some certain sectors. In this case, the recording area for additional supplementary information is secured within the shaded part in FIG. 10. The shaded part is a range from 168-column to 171-column, and locations in the same columns in which EDCs (error detection codes) are respectively allocated in the respective sectors (SC0 to SC15) within the ECC block.

The additional supplementary information is recorded within the shaded part for the following reasons.

First, because of the structure of the ECC block, arbitrary data can be recorded in the user data area.

However, even if the additional supplementary information to be recorded is about 100-byte data (not limited to about 100-byte data as a matter of course), it is actually necessary to rewrite EDC, error correction parity PI, PO according to the recording of the additional supplementary information. As a matter of course, if an embossed pit pattern is once formed, rewriting is no longer enabled. Accordingly, if the additional supplementary information is to be recorded, the parity etc. affected by the recording is recorded with the above described perforated marks 6 as additional records.

For example, the case where additional supplementary information is additionally recorded in a certain byte location as user data within a certain sector is considered.

Then, four-byte EDC of the sector is affected. Accordingly, it is necessary to set the part of four-byte EDC in the additional recording area (without forming an embossed pit pattern) and records the EDC as an additional record.

Further, since the PO parity in the same columns as those of the byte location where the additional supplementary information has been recorded and the EDC is also affected, it is also necessary to record them as additional records.

Furthermore, since the PI parity in the same rows as those of the byte location where the additional supplementary information has been recorded and the EDC, and the PI parity in the rows of the PO parity are also affected, it is also necessary to record them as additional records.

As described above, when the additional supplementary information is recorded with perforated marks using a part corresponding to a part of the user data as an additional recording area 10, it is necessary to form the affected parts of EDC, PO parity, and PI parity of the sector as additional areas 10 and record them with perforated marks in addition to the additional supplementary information.

Here, minimization of portions for additional recording is considered.

Hypothetically, the case where additional recording is performed in the byte location B2,0, for example, other than the shaded part within the sector SC0 in FIG. 10 is considered.

Regarding the PO parity, it is necessary to record the 16 bytes in the 0-column (B192,0 to B207,0) that is the same row as that of the byte location B2,0 as additional records. Further, also the EDC of the sector SC0 becomes an additional record, and thereby, the respective 16 bites of 168-column to 171-column of the PO parity become additional records.

That is, regarding the PO parity, the same column as that of the recording location of additional supplementary information and the same columns as those of the EDC are affected and it is necessary to additionally record the columns with perforated marks. However, from the opposite point of view, if the recording location of additional supplementary information is allocated in the same column as that of the EDC column, only the 168-column to 171-column of the PO parity in the same columns as those of the EDC are affected. That is, as shown by the shaded part, when the recording area of additional supplementary information is set within the range in the same columns as those of the EDC, the affected range of the PO parity can be minimized. Specifically, the affected range of the PO parity can be held within only the 4×16 bytes of B192,168 . . . B207,171 surrounded by the broken line as the range in the same columns as those of the EDC of the sector.

That is, in the sector for recording of additional supplementary information, the affected portions within the ECC block can be reduced by recording the information in the same columns as those of the EDC.

In this case, within one sector, additional supplementary information of 44 bytes of 4 bytes×11 rows as the shaded part can be recorded at the maximum.

With respect to one ECC block, additional supplementary information of 704 bytes of 44×16 sectors can be recorded at the maximum.

Practically, the allocated location of additional supplementary information may be set according to the data size (number of bytes) of identification information and the like to be recorded as the additional supplementary information, and it is not necessary to allocate all 44 bytes of the shaded part within one sector for recording of the additional supplementary information. For example, only four bytes (one row) may be allocated for recording of additional supplementary information within one sector, and 64 bytes of the 16 sectors may be used for recording in one ECC block.

As a matter of course, the number of sectors for recording of additional supplementary information may be arbitrary within an ECC block. Further, additional supplementary information may be recorded across plural ECC blocks.

The data size of additional supplementary information and the way of using sectors for recording are completely arbitrary. In any case, additional supplementary information may be recorded using a byte location in the same column range as that of EDC in each sector.

3. Matching at Starting Part of Additional Recording Area

Next, matching at the starting part of the additional recording area 10 is considered.

As described above, the pit row as an embossed pit pattern has already been formed on the bonded optical disc 197 to be supplied for the additional recording step, and part of the row is flat shape area as the additional recording area 10.

Here, what should be considered is how the data of additional recording information is formed in order that an arbitrary additional recording mark is additionally recorded without problem regardless of the status of the pit row already provided adjacently to the additional recording area 10 (e.g., whether the adjacent part immediately preceding to the additional recording area 10 is a land or pit, or a changing point of land/pit).

FIG. 11 shows locations corresponding to the additional recording area 10 in the case where all of four bytes in the respective rows in the same columns as those of EDC are used for recording of additional supplementary information in a certain recording sector rSC0.

In this case, the area on the optical disc (bonded optical disc 197) corresponding to the shaded part in FIG. 11 is used as the additional recording area 10.

That is, the parts of four bytes in the same columns as those of the EDC of the user data in the respective rows from the first row to the 12th row, four-byte EDC in the 12th row, four-byte PO parity in the same columns as those of the EDC of the PO parity in the 13th row formed by interleaving, and 10-byte PI parity of the respective rows from the first row to 13th row are contained in the additional recording area 10, and these are recorded in the additional recording mark row with perforated marks 6.

As will be described later, the location of part of the synchronization signal SY (10-bit SYNC ID) immediately following the PI parity may be contained in the additional recording area 10, and the 10-bit data is recorded with perforated marks 6.

Therefore, one additional recording area 10 is an area for recording four-byte user data (or EDC or PO parity) and 10-byte PI parity, and 10-bit SYNC ID, and, because one symbol (one byte within the sector structure) is recorded as 16 bits because of EFM+ modulation, becomes a 234-bit area on the optical disc.

Here, the immediately preceding locations to the starting part of the additional recording area 10 are locations with "54".

In this example, the immediately preceding pit row to the additional recording area 10, i.e., the last pit pattern of the part from the pit row to the additional recording area 10 is defined by a code word "54" or "47". Accordingly, "54" is written immediately before the additional recording area 10 as the shaded part in the drawing, however, "47" may be replaced.

As below, the reason for this will be explained.

First, in the case of additional recording in the additional recording area 10, it is desired that the immediately preceding embossed pit row ends at the land 3 and recording of perforated mark row is started with connection to the land 3.

Figure 12A:
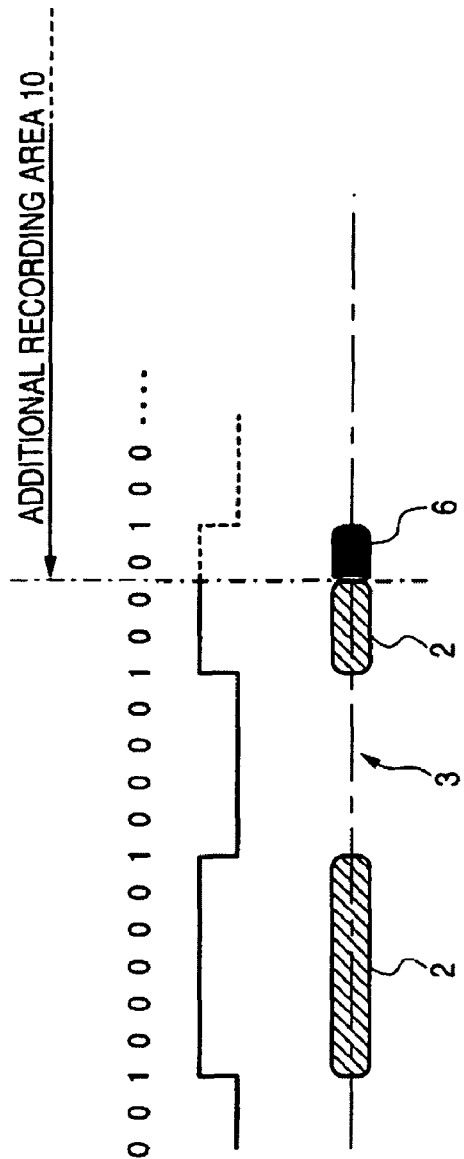
FIG. 12A is a diagram for explanation of an improper situation of a head part of the additional recording area following a pit row.

Hypothetically, a situation as in FIG. 12A is considered.

In FIG. 12A, it is assumed that code word "0010000010000100" formed by EFM+-modulation of a data symbol is an end of a pit row as an embossed pit pattern, and the pit row including pits 2 and lands 3 is formed as shown in the drawing.

Here, it is also assumed that recording is started from a certain code word "0100 . . . " in the additional recording area 10.

In this case, on the basis of logic inversion of NRZI format, a perforated mark 6 continuing from the pit 2 should be formed at the head of the additional recording area 10 as in the drawing. Further, for logic inversion at "1", the perforated mark 6 should have a length of 2T.

For example, in such a situation, a perforated mark 6 continuing from the immediately preceding pit 2 is formed at the start of writing of the additional recording area 10.

In the example in FIG. 12A, the first perforated mark 6 has a length of 2T. Even if the length is less than 2T or 3T or more, when the perforated mark 6 continuing from the pit 2 is formed, it is necessary to well-treat the connection part. For example, it is necessary to prepare a special light strategy that starts laser emission slightly earlier for producing an overlapping portion between the mark and the immediately preceding pit 2.

However, good connection between the pit 2 and the perforated mark 6 may not completely be ensured due to the complication in processing because the special light strategy should be executed at the start of writing in the additional recording area 10 and the writing for producing an overlapping portion.

Further, as in FIG. 12A, in the case where the first perforated mark 6 should be formed to have a length of 2T, laser emission less than 2T is necessary at the start of writing in the additional recording area 10. However, it is difficult to accurately control the formation of perforated mark/land in a short time such as 1T or 2T in additional recording.

If any laser emission less than 2T is not allowed to be generated at the start of writing in the additional recording area 10, it is necessary to select one that is not inversed at the leading three bits as a symbol at the start of writing. However, very complicated processing is necessary for this.

Figure 12B:
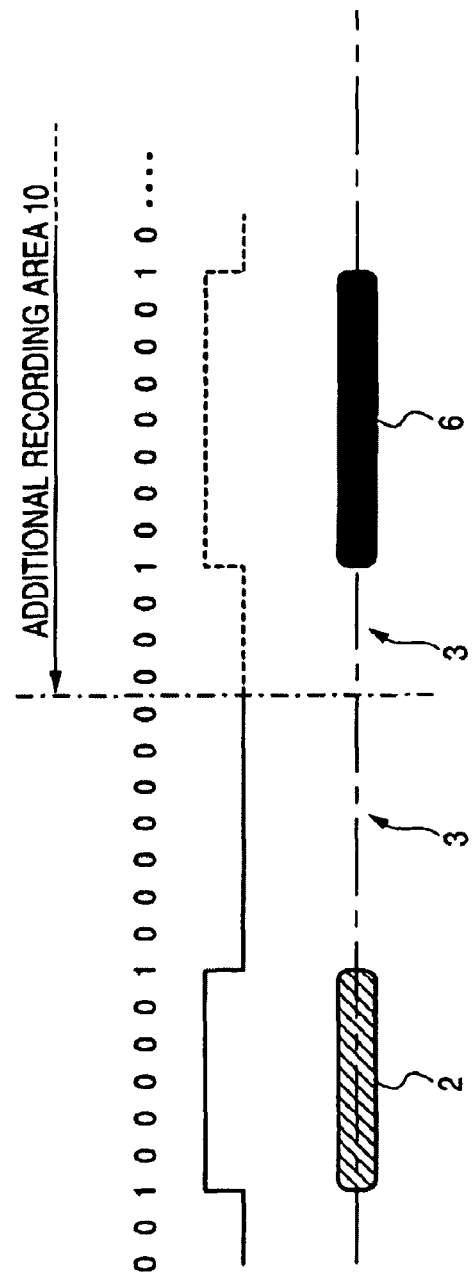
FIG. 12B is a diagram for explanation of an improper situation of the head part of the additional recording area following the pit row.

For the reasons, it is desired to avoid recording starting from the perforated mark 6 in the additional recording area 10. Therefore, in the case of additional recording in the additional recording area 10, it is desired that the immediately preceding embossed pit row ends at the land 3 and recording of perforated mark row is started with connection to the land 3. For example, as shown in FIG. 12B, if the immediately preceding row ends at the land 3, the writing of the additional recording area 10 can be started with the land 3.

For example, if there is such land connection, it is not necessary to prepare the special light strategy or select one that is not inversed at the leading three bits as a symbol at the start of writing.

Accordingly, the case where the head of the additional recording area 10 starts with land connection is considered. In other words, the case where the immediately preceding pit row to the additional recording area 10 ends at the land 3 is considered.

In still other words, a situation that the pit row ends at the land 3 can be selected as the last code word of the immediately preceding embossed pit row to the additional recording area 10.

In order to start the additional recording area 10 at the land 3, the pit row according to the immediately preceding code word of the data symbol to the additional recording area 10 may end at the land 3. However, the way of ending of the immediately preceding code word to the additional recording area 10 is affected by the way of ending of the further immediately preceding code word of the data symbol. That is, because of NRZI format that H/L logic is inverted at "1", depending on whether the initial part of the immediately preceding code word to the additional recording area 10 is "H" or "L" (i.e., whether the further immediately preceding code word ends with "H" or "L"), whether the last part is the pit 2 or land 3 is uncertain. This is because numbers of reversal of polarity of code word vary from one data symbol to another and the polarity at the end may change depending on whether the number is odd or even.

In this case, in order to ensure that the immediately preceding row to the additional recording area 10 ends at the land 3, it is proper that the immediately preceding data symbol to the additional recording area 10 has a code word in which whether the number of reversal of polarity is odd or even can be selected according to the further preceding data symbol. That is, it is necessary that whether the data symbol has a code word with an even number of reversal of polarity or a code word with an odd number of reversal of polarity can be arbitrarily selected (polarity can be manipulated) at the time of EFM+ modulation.

Here, a conversion table of EFM+ modulation is considered.

In the DVD data format, regarding EFM+ modulation, a main conversion table partially excerpted and shown in FIG. 14 and a sub-conversion table partially excerpted and shown in FIG. 15 are specified.

First, the main conversion table in FIG. 14 will be explained.

In the main conversion table, 16-bit code words for converting data symbols "0" to "255" as 8-bit (1-byte) data values by EFM+ modulation are defined.

Further, four kinds of code words of state 1, state 2, state 3, and state 4 are defined as code words corresponding to one data symbol.

Furthermore, one of "1" to "4" is determined as the next state for each code word.

The next state indicates which state of code word is used for the next data symbol.

For example, the case where a data row of data symbols of "0", "88", "49" and "255" is EFM+-modulated is considered.

First, the data symbol "0" is converted into the code word in state 1 "0010000000001001" for example. Which state of code word is used is arbitrary for the first data symbol of recording data.

"1" is the next state of the code word in state 1 of the data symbol "0". Accordingly, the next data symbol "88" is converted into the code word in state 1 "0001000100010000".

Further, "3" is the next state of the code word in state 1 of the data symbol "88". Accordingly, the next data symbol "49" is converted into the code word in state 3 "1000000010001000".

Furthermore, "2" is the next state of the code word in state 3 of the data symbol "49". Accordingly, the next data symbol "255" is converted into the code word in state 2 "0100011001 0010".

As described above, in EFM+ modulation, a code word of each data symbol is selected in the state determined by the next state. This is for adapting the connection part of the respective data symbols to run length limitation.

Here, regarding data symbols "0" to "87", a sub-conversion table shown in FIG. 15 is specified.

In the sub-conversion table, four kinds of code words of state 1, state 2, state 3, and state 4 are also defined as code words corresponding to one data symbol.

Further, one of "1" to "4" is determined as the next state for each code word.

Regarding data symbols "0" to "87", the sub-conversion table is provided and a total of eight code words are selectable. The code words in the sub-conversion table may be used together with the main conversion table.

For example, as described above, when the next state "3" is designated by the cord word of the data symbol "88" and the next data symbol is "49", not only the code word in state 3 "1000000010001000" of the main conversion table but also the code word in state 3 "1001000000001001" of the sub-conversion table may be selected.

The sub-conversion table is provided for adjusting an average ratio of pit/land to regulate the DC offset component of a reproduction RF signal.

That is, with respect to the same data symbol and the same state, the number of inversions (the number of "1") are different in even or odd number between the main conversion table and the sub-conversion table. Thereby, for the recording data in which there are more areas of pits 2 than areas of lands 3 on the recording track using only the main conversion table, for example, the land part and pit part may be made equal by partially utilizing the sub-conversion table to adjust the number of logic inversions.

EFM+ modulation is performed using the main conversion table and the sub-conversion table. Here, the above described data symbols on which polarity manipulation can be performed are considered.

In order that the immediately preceding pit row to the additional recording area 10 ends at the land 3, the last code word of the immediately preceding pit row may have the number of logic inversions (the number of "1") that can be selected from an even number or odd number. This means that the code word may be selected from the main conversion table and the sub-conversion table.

Therefore, the last data symbol of the immediately preceding pit row may be a value within a range from "0" to "87".

Here, the state information is further considered.

As described above, in EFM+ conversion, the state of the code word of the data symbol is determined and selected by the next state of the immediately preceding code word.

Naturally, this should be applied to the last code word of the embossed pit row, the perforated mark 6, and the first code word.

Then, if writing is to be performed in the additional recording area 10, the additional information recording device 150 should grasp information of the next state of the last code word in the immediately preceding embossed pit row that has been already formed, and select the state based thereon and perform EFM+ conversion. This makes the processing in the entire manufacturing system complicated and makes the versatile usage that the additional information recording device 150 is used not within the factory for manufacturing process in FIG. 1 but in another place and at another time difficult.

However, if the state of the first code word of the additional recording area 10 may be surely set to a certain state, it is no longer necessary for the additional information recording device 150 to consider the information of the next state of the last code word of the immediately preceding embossed pit row.

This means that there should be eight states that have the same next state in the main conversion table and the sub-conversion table.

"47" and "54" framed in FIGS. 14 and 15 satisfy the condition. Regarding the "47" and "54", the next state "1" is designated in all of the code words shown in the main conversion table and the sub-conversion table.

If the immediately preceding data symbol to the additional recording area 10 is "47" or "54", state 1 may surely be selected as the state of the code word of the start of writing in the additional recording area 10.

As described above, when the state at the start of the additional recording area 10 is unified into state 1, it becomes unnecessary to transmit the state information at the starting part of each additional recording area 10 to the additional information recording device 150. For example, if the last symbol of the immediately preceding pit row to the additional recording area 10 is other than "47" or "54", the additional information recording device 150 can properly select the state only after acquiring the information of the next state of the last code word of the pit row. However, the state is unified as state 1, and it is not necessary for the device to receive the designation information of the next state from the additional recording management unit 160.

This is preferable not only for simplification of the processing of the additional information recording device 150 but also for system expansion.

Consequently, when the last symbol of the immediately preceding pit row to the additional recording area 10 is "47" or "54", data recording matching with the immediately preceding pit row at the starting part of the additional recording area 10 can be performed without especially complicated processing or transfer of state information, and the perforated mark row having stable shapes can be formed with the land 3 as its head.

In the main conversion table and the sub-conversion table of EFM+conversion, the code words in state 1 of all data symbols have first 2 bits of "00", and thereby, the head of the additional recording area 10 is started from the land 3 having a length of 2T or more.

FIGS. 13A and 13B show statuses when the code word of the data symbol "54" is the last code word of the immediately preceding pit row to the additional recording area 10.

FIGS. 13A and 13B show cases where the code word in state 1 is selected for the data symbol "54". These are the cases where the state 1 has been designated in the further preceding code word. As a matter of course, a code word in state 2 to state 4 may be selected for the "54".

Here, FIG. 13A shows the case where the code word of "54" is started by "L" logic because the last of the further preceding code word is "L".

On the other hand, FIG. 13B shows the case where the code word of "54" is started by "H" logic because the last of the further preceding code word is "H".

If started by "L" logic, in order to end the pit row at land 3, the code word of "54" may be selected from the main conversion table. The code word in state 1 of "54" in the main conversion table is "0010000010010010", and the number of inversions is an even number. Accordingly, as shown in the drawing, the pits 2 and lands 3 are formed and the ending part is the land 3.

On the other hand, if started by "H" logic, in order to end the pit row at land 3, the code word of "54" may be selected from the sub-conversion table. The code word in state 1 of "54" in the sub-conversion table is "0000001000100001", and the number of inversions is an odd number. Accordingly, as shown in the drawing, the pits 2 and lands 3 are formed and the ending part is the land 3.

For the data symbol on which polarity manipulation can be performed, the main conversion table or the sub-conversion table is selectable, and the even/odd number of inversions is also selectable. Thereby, regardless the preceding data symbol, the pit row may be ended at the land 3 (i.e., recording in the additional recording area 10 can be started with land connection).

As a matter of course, even when the state 2, state 3, or state 4 is designated according to the immediately preceding code word for the "54", the code word may be selected from the main conversion table and the sub-conversion table according to the starting logic for ending the ending part at the land 3.

Here, the data symbol 54 has been illustrated, and the same applies to the "47".

Therefore, as shown in FIG. 11, when the immediately preceding pit row shown by the shaded part to the additional recording area 10 is data symbol "54" or "47", proper additional recording can be performed at the starting part of the additional recording area 10.

More specifically, in the case where the head of the additional recording area 10 is the byte location B0,168 or B1,168 in FIG. 10, for example, the sector data may be set so that the immediately preceding byte location B0,167 or B1,167 may be the data symbol "54" or "47".

Further, in the case where the perforated mark 6 is recorded by the light emission of a laser or the like in the additional recording area 10, the polarity of the data symbol starts from a land, the light emission less than 2T is suppressed, and thus, advantages such that ranges of the frequency characteristic of the laser drive circuit of the additional information recording device 150 and the MTF design of the optical system become wider, and the consideration for light strategy of 1T and 2T is no longer necessary are obtained.

4. Matching at Ending Part of Additional Recording Area

Subsequently, matching at the ending part of the additional recording area 10 will be described.

As shown in FIG. 11, in the structure of the recording sector, synchronization signal SY is added with respect to each 91 bytes.

Eight kinds of synchronization signals SY of SY0 to SY7 are defined, and the synchronization signal SY is added to each data of 91 bytes in the sequence (SY0→SY5→SY1→SY5→SY3→SY5→SY4→ . . . ) shown in FIG. 11.

The sequence of the respective synchronization signals SY0 to SY7 is unique within a sector. For example, the respective sequences of "SY0→SY5", "SY5→SY1", and "SY1→SY5" appear at once within the sector. Accordingly, the position within the sector can be detected according to the anterior and posterior sequence of the synchronization signals SY.

Here, when additional supplementary information and EDC, and affected PO parity, PI parity are mitten as additional information within the sector, the shaded part in FIG. 11 is the additional recording area 10 as described above.

Since the synchronization signal SY is allocated subsequently to the PI parity, the synchronization signal SY immediately follows each additional recording area 10. Here, in this example, the first 10-bit part of the synchronization signal SY is contained in the additional recording area 10 as shown by the shaded part in FIG. 11 and recorded with the additional recording mark row, and thus, proper matching at the ending part of the additional recording area 10 may be obtained.

Here, the synchronization signal SY in the DVD data format will be explained.

Figure 16:
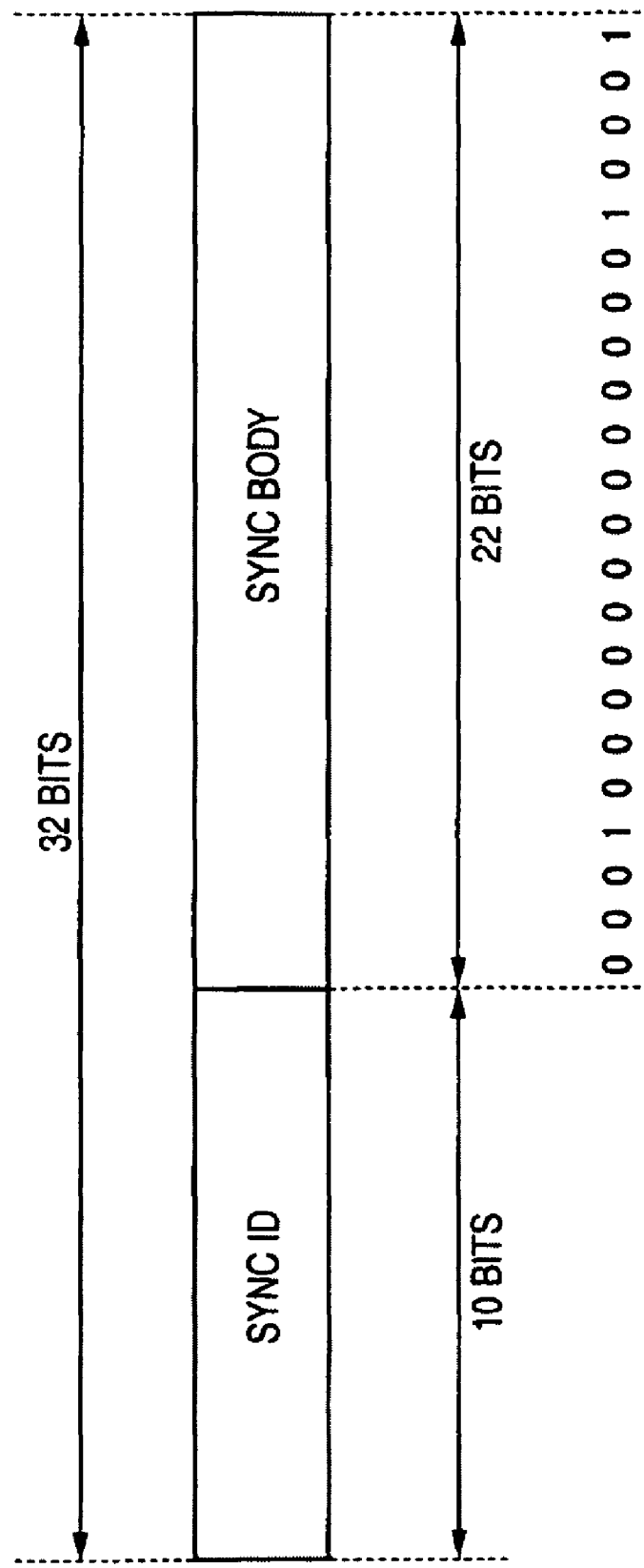
FIG. 16 is a diagram for explanation of a SYNC code.

The synchronization signal SY is formed by a 32-bit SYNC code as shown in FIG. 16. Further, the first 10 bits of the 32 bits are used as a SYNC ID and the other 22 bits are used as a SYNC body.

The SYNC ID is an identification code for identifying the synchronization signals SY1 to SY7. Further, the SYNC body is a 22-bit pattern "0001000000000000010001" that is common among the synchronization signals SY1 to SY7, i.e., a code containing a 14T pattern specific to the synchronization signal.

Figure 17:
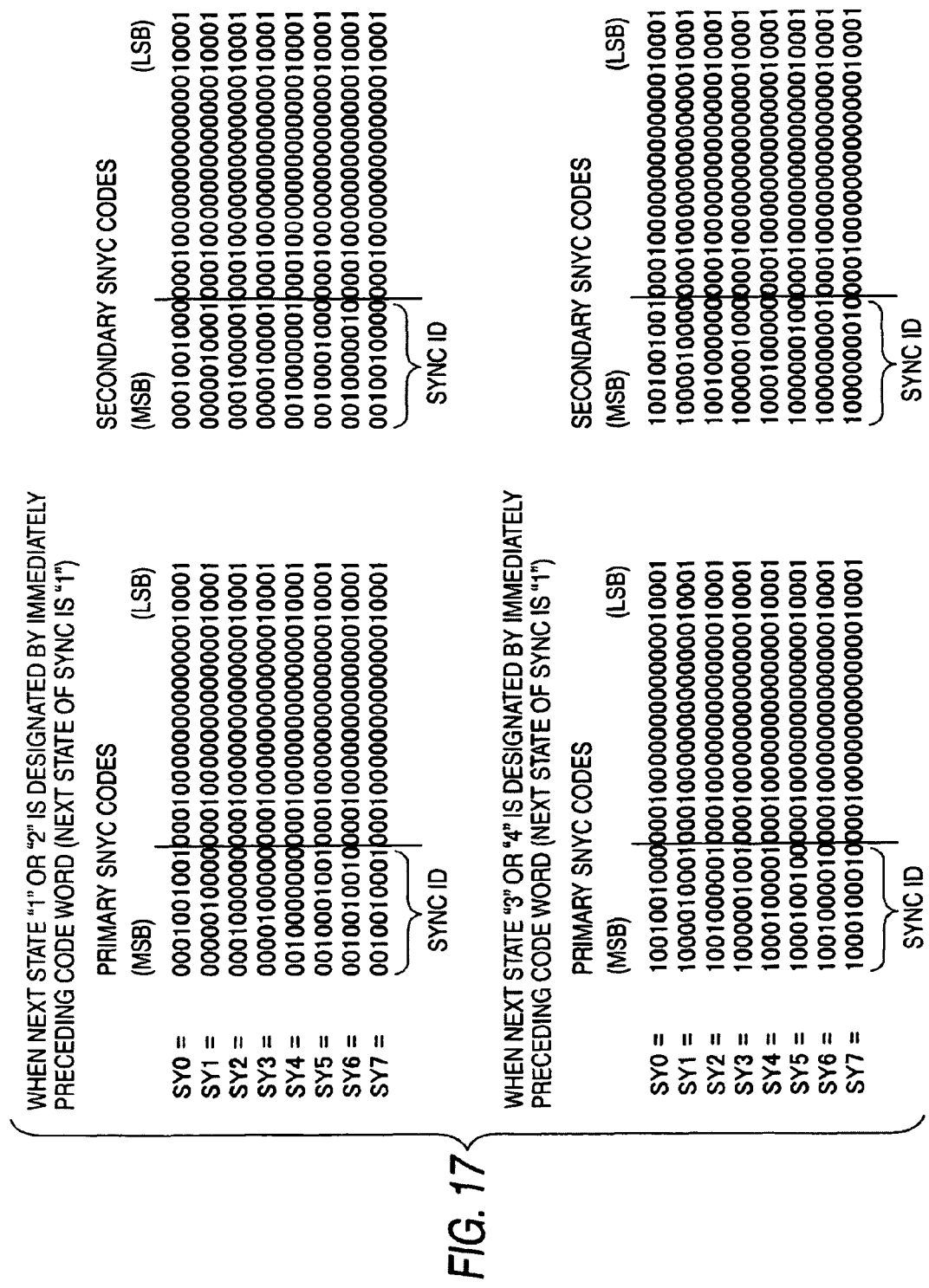
FIG. 17 is a diagram for explanation of kinds of SYNC codes of the DVD.

Four patterns are defined for the respective synchronization signals SY1 to SY7 as shown in FIG. 17.

First, for the immediately preceding code word to the synchronization signal SY, the next state is "1" or "2" is designated, the primary SYNC code or secondary SYNC code in the upper half of FIG. 17 is used.

Further, for the immediately preceding code word to the synchronization signal SY, the next state is "3" or "4" is designated, the primary SYNC code or secondary SYNC code in the lower half of FIG. 17 is used.

Regarding the relation between the primary SYNC code and the secondary SYNC code, as is the above described case of the relation between the main conversion table and the sub-conversion table, the number of logic inversions may be selected as an odd number or even number.

As also seen from FIG. 17, the 22-bit SYNC body is common among all SYNC codes and the respective synchronization signals SY1 to SY7 are defined in four patterns with the first 10-bit SYNC IDs.

In the case where the ending part of the additional recording area 10 is properly connected to the pit row, it is preferable that the SYNC ID aid the SYNC body are separately considered.

That is, since the part of SYNC ID is to be selected according to the designation of the next state of the immediately preceding code word, it is not selectable until the additional information is recorded.

On the other hand, the part of SYNC body has the same code pattern regardless of the selected SYNC code.

On this account, it is understood that the thing to do is to end the additional recording area 10 at the SYNC ID and start the pit row continuing to the additional recording area 10 from the part of SYNC body.

That is, at the stage of the bonded optical disc 197 in FIG. 1, the additional recording area 10 is formed to include the part of the SYNC ID as a flat shape area, and the embossed pit pattern of the SYNC body is formed to continue from the flat shape area.

Note that, in this case, it may be impossible to form the SYNC body if it is unknown whether the embossed pit row of the SYNC body starts with a land 3 or pit 2, however, to put it other way around, if whether the head of the SYNC body is a land 3 or pit 2 is determined in advance, matching can be obtained by the selection of the pattern of the SYNC ID (the selection between the primary SYNC code and the secondary SYNC code).

For example, when the head of the SYNC body immediately following the additional recording area 10 (i.e., the 11th bit of the SYNC code) is determined to be a land 3, regarding the SYNC body from 11th bit to 32nd bit, the 14th bit to 27th bit may be created as a 14T pit.

On the other hand, when the head of the SYNC body immediately following the additional recording area 10 is determined to be a pit 2, regarding the SYNC body from 11th bit to 32nd bit, the 14th bit to 27th bit may be created as a 14T land.

Regarding the case where the SYNC body immediately following the additional recording area 10 is determined to start from a land, the statuses of the ending part of the additional recording area 10 are shown in FIGS. 18A to 18C.

FIG. 18A shows a status in which recording is not yet performed in the additional recording area 10 (i.e. the stage of the bonded optical disc 197), and, as the pit row following the additional recording area 10, the 11th and subsequent bits of the SYNC code start from the land 3 and the pit 2 of 14T is formed.

In this case, it is assumed that the additional recording mark row is recorded in the additional recording area 10 and the SYNC ID of the synchronization signal SY1 is recorded in the ending part thereof.

Further, it is also assumed that the next state is "1" or "2" for the code word additionally recorded immediately before the synchronization signal SY1. Then, the SYNC code of the synchronization signal SY1 in the upper half of FIG. 17 is selected. Here, the pit row has been already formed to start with the land 3, and the part of the SYNC ID may be continued to the SYNC body at the land 3.

That is, if the SYNC ID starts with "H" logic, as shown in FIG. 18B, the primary SYNC code "0000010000" of the synchronization signal SY1 is selected. Thereby, the perforated mark 6 and the land 3 are formed as shown in the drawing and connected to the immediately following SYNC body without logic inconsistency.

On the other hand, if the SYNC ID starts with "L" logic, as shown in FIG. 18C, the secondary SYNC code "0000010001" of the synchronization signal SY1 is selected. Thereby, also in this case, the perforated mark 6 and the land 3 are formed as shown in the drawing and connected to the immediately following SYNC body without logic inconsistency.

Alternatively, the SYNC body immediately following the additional recording area 10 may be determined to start from a pit, and the statuses of the ending part of the additional recording area 10 are shown in FIGS. 19A to 19C.

FIG. 19A shows a status in which recording is not yet performed in the additional recording area 10 (i.e., the stage of the bonded optical disc 197), and, as the pit row following the additional recording area 10, the 11th and subsequent bits of the SYNC code start from the pit 2 and the land 3 of 14T is formed.

In this case, it is assumed that the SYNC ID of the synchronization signal SY1 is recorded at the ending part of the additional recording area 10 as is the case shown in FIG. 18A. Further, it is also assumed that the next state is "1" or "2" for the code word additionally recorded immediately before the synchronization signal SY1 and the synchronization signal SY1 in the upper half of FIG. 17 is selected.

In this case, the pit row has been already formed to start with the pit 2, and the part of the SYNC ID may be continued to the SYNC body at the pit 2.

That is, if the SYNC ID starts with "H" logic, as shown in FIG. 19B, the secondary SYNC code "0000010001" of the synchronization signal SY1 is selected. Thereby, also in this case, the perforated mark 6 and the land 3 are formed as shown in the drawing and connected to the immediately following SYNC body without logic inconsistency.

On the other hand, if the SYNC ID starts with "L" logic, as shown in FIG. 19C, the primary SYNC code "0000010000" of the synchronization signal SY1 is selected. Thereby, the perforated mark 6 and the land 3 are formed as shown in the drawing and connected to the immediately following SYNC body without logic inconsistency.

That is, the SYNC ID is to be additionally recorded in the additional recording area 10 and whether the immediately following SYNC body as the pit row starts with a land or pit is determined, and thereby, the SYNC body can be formed in an embossed pit pattern in advance and, at the time of additional recording, matching between the ending part of the additional recording area 10 and the following pit row can be obtained by properly selecting the SYNC ID at the ending part of the additional recording area 10.

5. Advantages of Embodiment and Modified Examples

According to the above described embodiment, when additional information is recorded in the additional recording area after the pit row is formed, formation of the additional recording mark row can be realized efficiently and adaptively to the data format without exception regardless of additional information contents. Further, complicated arithmetic processing for adaptation to format is unnecessary.

Specifically, since the allocated location of additional supplementary information is set to be in the same column of that of the EDC within the sector in the ECC block, the part to be additionally recorded as PO parity can be minimized and the efficiency of additional recording can be improved.

Further, since the immediately preceding pit row to the additional recording area 10 is the code word of the data symbol "47" or "54", writing of the additional recording area 10 can be started because of the land connection, and the formation of the perforated mark 6 continuing from the pit 2 and the control of 1T and 2T can be solved at the head part of the additional recording area 10. Furthermore, since the state of the code word at the head of the additional recording area 10 is unified into state 1, it is unnecessary to grasp the next state of the immediately preceding code word. As a matter of course, the run length at the connection part between the pit row and the additional recording mark row may be made proper because the relation between the immediately preceding code word and the next state is held. For the reasons, proper recording of perforated mark row can be easily realized.

Further, since the SYNC ID is recorded at the ending part of the additional recording area 10, the ending part is connected to the SYNC body as the embossed pit pattern, and the head of the SYNC body is determined to be a land 3 or pit 2, the connection at the ending part of the additional recording area 10 can be properly realized.

Thereby, the technology of the embodiment becomes a preferable technique, when additional information is recorded on the bonded optical disc 197 to form a completed product of read-only optical disc 90 (DVD), for completing the read-only optical disc 90 without violation of DVD standards or errors.

Further, since additional supplementary information such as identification information with respect to each individual in a read-only optical disc as a DVD-ROM can be recorded more easily, the embodiment is preferable for widespread use of the information additional recording technology for read-only optical discs.

In the embodiment, an example embodying the invention has been described as the read-only optical disc 90 of the DVD system, however, the concept of the invention is applicable to read-only optical discs of other disc systems and the manufacturing methods according to the data formats thereof.

Furthermore, one embodiment of the invention may be preferable as a method of recording additional information including additional supplementary information not only in the read-only optical discs but also in write-once optical discs in which pigment films are formed and data is recorded with pigment change mark rows and rewritable optical discs in which phase-change films are formed and data is recorded with phase-change marks.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of recording data, the method comprising:
(a) a first recording step of recording data in a condition that, within a certain error correction block in a data format in which error correction blocks with n rows and m columns including at least main data, error detection code, and error correction parity are formed, an allocated location of additional supplementary information is set in a location in the same column which includes the error detection code, and an additional recording area is formed for recording additional information containing the additional supplementary information and the error detection code and the error correction parity necessary to be recorded according to the recording of the additional supplementary information; and
(b) thereafter, a second recording step of recording the additional information in the additional recording area, wherein:
(i) the data format is a data format of a DVD-system read-only optical disc; and
(ii) the first recording step is executed to provide an immediately preceding part of the additional recording area with a code word of a data symbol "47" or "54" determined by an EFM+ conversion table.

2. A method of recording data, the method comprising:
(a) a first recording step of recording data in a condition that, within a certain error correction block in a data format in which error correction blocks with n rows and m columns including at least main data, error detection code, and error correction parity are formed, an allocated location of additional supplementary information is set in a location in the same column which includes the error detection code, and an additional recording area is formed for recording additional information containing the additional supplementary information and the error detection code and the error correction parity necessary to be recorded according to the recording of the additional supplementary information; and
(b) thereafter, a second recording step of recording the additional information in the additional recording area, wherein:
(i) a synchronization signal is formed by a SYNC ID and a SYNC body; and
(ii) at the second recording step, the SYNC ID part of the synchronization signal is recorded as the additional information at an ending part of the additional recording area.

3. A method of manufacturing a read-only optical disc including a pit row including embossed pits and lands with which information is recorded, the method comprising the steps of:
regarding recording data in a data format in which error correction blocks with n rows and m columns including at least main data, error detection code, and error correction parity are formed, within a certain error correction block, setting an allocated location of additional supplementary information in a location in the same column which includes the error detection code as a location within the error correction block;
forming the pit row based on the recording data on the optical disc, and forming an additional recording area on the optical disc as an area in which the pit row is not formed for recording additional information containing at least the additional supplementary information and the error detection code and the error correction parity necessary to be recorded according to the recording of the additional supplementary information; and recording the additional information in the additional recording area with an additional recording mark row including additional recording marks and lands after forming the pit row, wherein:
(i) the data format is a data format of a DVD-system read-only optical disc; and
(ii) the pit row is formed to be a pit row according to a code word of a data symbol "47" or "54" determined by an EFM+ conversion table in an immediately preceding part to the additional recording area.

4. The method of manufacturing a read-only optical disc of claim 3, wherein:
(a) the pit row is formed in a concavo-convex shape coated with a reflecting film on the optical disc;
(b) the additional recording area is formed as a flat shape area coated with a reflecting film; and
(c) the additional information is recorded with the additional recording mark row including the additional recording marks formed by eliminating or reducing the reflecting film of the additional recording area and the lands as flat portions coated with the reflecting film.

5. The method of manufacturing a read-only optical disc of claim 3, wherein the additional information is recorded with the additional recording mark row having a head of the land in the additional recording area.

6. The method of manufacturing a read-only optical disc of claim 3, wherein the pit row is formed with a head of the pit row immediately following the additional recording area fixedly unified into either an embossed pit or land.

7. A method of manufacturing a read-only optical disc including a pit row including embossed pits and lands with which information is recorded, the method comprising the steps of:

regarding recording data in a data format in which error correction blocks with n rows and m columns including at least main data, error detection code, and error correction parity are formed, within a certain error correction block, setting an allocated location of additional supplementary information in a location in the same column which includes the error detection code as a location within the error correction block;

forming the pit row based on the recording data on the optical disc, and forming an additional recording area on the optical disc as an area in which the pit row is not formed for recording additional information containing at least the additional supplementary information and the error detection code and the error correction parity necessary to be recorded according to the recording of the additional supplementary information; and recording the additional information in the additional recording area with an additional recording mark row including additional recording marks and lands after forming the pit row, wherein:
(i) a synchronization signal is formed by a SYNC ID and a SYNC body; and
(ii) the SYNC ID part of the synchronization signal is recorded as the additional information at an ending part of the additional recording area.

* * * * *